United States Patent
Xu

(10) Patent No.: US 12,254,174 B2
(45) Date of Patent: Mar. 18, 2025

(54) METHOD AND DEVICE FOR DISPLAYING TWO APPLICATION INTERFACES IN FOLDED AND UNFOLDED STATES OF THE DEVICE

(71) Applicant: Huawei Technologies Co., Ltd., Shenzhen (CN)

(72) Inventor: Jie Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 17 days.

(21) Appl. No.: 17/970,731

(22) Filed: Oct. 21, 2022

(65) Prior Publication Data
US 2023/0046708 A1 Feb. 16, 2023

Related U.S. Application Data

(63) Continuation of application No. PCT/CN2021/084387, filed on Mar. 31, 2021.

(30) Foreign Application Priority Data

Apr. 24, 2020 (CN) .......................... 202010335473.2

(51) Int. Cl.
   *G06F 3/04845* (2022.01)
   *G06F 3/04886* (2022.01)
   *H04M 1/02* (2006.01)

(52) U.S. Cl.
   CPC ...... *G06F 3/04886* (2013.01); *G06F 3/04845* (2013.01); *G06F 2203/04803* (2013.01); *H04M 1/0268* (2013.01)

(58) Field of Classification Search
   None
   See application file for complete search history.

(56) References Cited

U.S. PATENT DOCUMENTS

2010/0298033 A1* 11/2010 Lee .................. G06F 1/1616
                                                             455/566
2013/0268837 A1* 10/2013 Braithwaite .......... G06F 16/958
                                                             715/234
(Continued)

FOREIGN PATENT DOCUMENTS

CN   104793839 A   7/2015
CN   303877382 S   10/2016
(Continued)

OTHER PUBLICATIONS

CN107704177A (English Translation), "Interface display method and device and terminal" Inventor: Li, Hong Publication: Feb. 16, 2018 (Year: 2018).*

*Primary Examiner* — Rinna Yi
(74) *Attorney, Agent, or Firm* — Conley Rose, P.C.

(57) ABSTRACT

An application interface interaction method. The method includes in response to a first touch operation on a floating notification of a second application displayed on a first interface of a first application, when an electronic device is in an unfolded state, displaying the first interface of the first application and a second interface of the second application in a split-screen manner; and when the electronic device is in a folded state, switching the first interface of the first application to the second interface of the second application, or displaying, in full screen, the second interface of the second application and displaying the first application in a floating point manner or a floating ball manner.

20 Claims, 24 Drawing Sheets

(56) References Cited

U.S. PATENT DOCUMENTS

| | | |
|---|---|---|
| 2014/0101535 A1* | 4/2014 | Kim .................. G06F 3/04886 715/761 |
| 2014/0237420 A1* | 8/2014 | Song .................. G06F 3/04817 715/788 |
| 2014/0320425 A1 | 10/2014 | Jeong et al. |
| 2015/0079963 A1 | 3/2015 | Sun et al. |
| 2015/0277692 A1 | 10/2015 | Liu |
| 2016/0062552 A1* | 3/2016 | Jeong .................. G06F 3/0481 715/788 |
| 2016/0334989 A1 | 11/2016 | Liu et al. |
| 2021/0342045 A1 | 11/2021 | Wang |
| 2022/0269405 A1 | 8/2022 | Wu et al. |
| 2022/0300129 A1 | 9/2022 | Zhu et al. |
| 2022/0321691 A1 | 10/2022 | Yao |

FOREIGN PATENT DOCUMENTS

| | | |
|---|---|---|
| CN | 107219974 A | 9/2017 |
| CN | 107315518 A | 11/2017 |
| CN | 107402694 A | 11/2017 |
| CN | 107704177 A | 2/2018 |
| CN | 107844228 A | 3/2018 |
| CN | 108255565 A | 7/2018 |
| CN | 109766053 A | 5/2019 |
| CN | 305160760 S | 5/2019 |
| CN | 109885223 A | 6/2019 |
| CN | 305280929 S | 7/2019 |
| CN | 305351675 S | 9/2019 |
| CN | 110489043 A | 11/2019 |
| CN | 110493651 A | 11/2019 |
| CN | 110602273 A | 12/2019 |
| CN | 110633043 A | 12/2019 |
| CN | 110727381 A | 1/2020 |
| WO | 2014114114 A1 | 7/2014 |
| WO | 2015106514 A1 | 7/2015 |
| WO | 2018094976 A1 | 5/2018 |
| WO | 2019174477 A1 | 9/2019 |
| WO | 2019174546 A1 | 9/2019 |

* cited by examiner

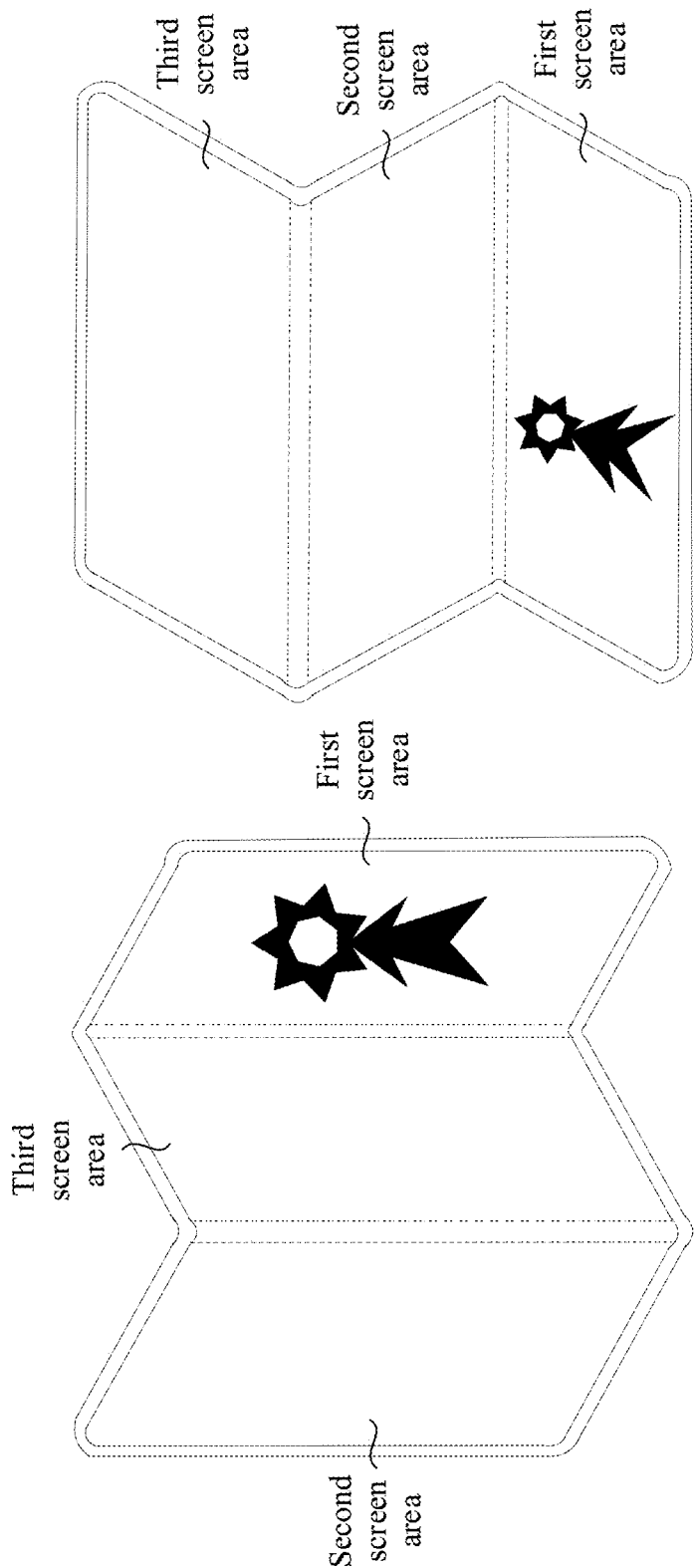

METHOD AND DEVICE FOR DISPLAYING TWO APPLICATION INTERFACES IN FOLDED AND UNFOLDED STATES OF THE DEVICE

CROSS-REFERENCE TO RELATED APPLICATIONS

This is a continuation of International Patent Application No. PCT/CN2021/084387 filed on Mar. 31, 2021, which claims priority to Chinese Patent Application No. 202010335473.2 filed on Apr. 24, 2020. The disclosures of the aforementioned applications are hereby incorporated by reference in their entireties.

TECHNICAL FIELD

This disclosure relates to the field of electronic technologies, and in particular, to an application interface interaction method, an electronic device, and a computer-readable storage medium.

BACKGROUND

With continuous development of electronic devices such as a smartphone and a foldable mobile phone, various types of applications may be installed in the electronic device to provide different services for a user. In an actual application scenario, in a process in which the electronic device displays an application interface of an application, another application of the electronic device may receive a new message. Usually, the new message is displayed on the top of the screen in a form of a floating notification. If the user expects to view the new message, the user needs to tap the floating notification to switch to an application interface for receiving the new message. Then, if the user expects to return to the originally running application, the user needs to first exit the application interface for receiving the message, enter a recent task interface to find the application, and tap the application to return to the application interface of the application. Consequently, user operation efficiency is low, and experience is poor.

SUMMARY

This disclosure discloses an application interface interaction method, an electronic device, and a computer-readable storage medium. After receiving a floating notification, the electronic device may display, in a floating manner or a split-screen manner, a currently running application and an application to which the floating notification belongs, to reduce time for a user to return to the currently running application, and improve user operation efficiency.

According to a first aspect, an embodiment of this disclosure provides an application interface interaction method, applied to an electronic device. The method includes the following. The electronic device displays a floating notification in an application interface of a first application, where the floating notification is used to indicate information received by a second application during running of the first application, the first application is any application that has been installed in the electronic device, and the second application is any application other than the first application that has been installed in the electronic device. The electronic device detects a touch operation on the floating notification. The electronic device displays, in response to the touch operation, the first application and/or the second application in a floating manner or a split-screen manner based on an aspect ratio value of a screen of the electronic device.

In this embodiment of this disclosure, after detecting the floating notification that is of the second application and that is displayed in the application interface of the currently running first application, the electronic device displays the first application and/or the second application in the floating manner or the split-screen manner based on the aspect ratio value of the screen of the electronic device, that is, simultaneously displays the first application and the second application on a current screen. This helps a user complete switching between application interfaces of two applications, reduces time for the user to return to a currently running application, and improves user operation efficiency.

The floating manner refers to displaying an application at a predetermined location on the screen in a floating manner by using a virtual key in a preset shape, and includes a floating point manner, a floating ball manner, or a floating window. The floating point manner is that a dot-shaped virtual key that indicates an application is displayed on the top of the screen in a floating state. The floating ball manner is that a spherical virtual key that indicates an application is displayed on the top of the screen in a floating state. The floating window manner is that a window that corresponds to an application interface of an application is displayed on the top of the screen in a floating state. In this embodiment of this disclosure, a virtual key indicating an application in the floating point manner is set as a floating point, a virtual key indicating an application in the floating ball manner is set as a floating ball, and a virtual key corresponding to an application interface of an application in the floating window manner is set as a floating window. The floating point, the floating ball, and the floating window may be randomly dragged to any location in a display area of the electronic device.

The split-screen manner includes a vertical split-screen manner and a horizontal split-screen manner. The vertical split-screen manner is dividing the display area of the electronic device into two screen areas: an upper half screen and a lower half screen, and the horizontal split-screen manner is dividing the display area of the electronic device into two screen areas: a left half screen and a right half screen. In this embodiment of this disclosure, the electronic device determines, based on the aspect ratio value of the screen of the electronic device, whether to display the application interface of the first application and an application interface of the second application in the vertical split-screen manner or the horizontal split-screen manner. For example, when the aspect ratio value of the screen of the electronic device is within a first value range, the electronic device displays the application interface of the first application and the application interface of the second application in the vertical split-screen manner. When the aspect ratio value of the screen of the electronic device is within a second value range, the electronic device displays the application interface of the first application and the application interface of the second application in the horizontal split-screen manner. This can fully use a screen display effect of the electronic device, and improve visual experience of a user.

The foregoing touch operation includes but is not limited to a tap operation, a drag operation, a press operation, a touch and hold operation, and a slide operation.

With reference to the first aspect, in some embodiments, that the electronic device displays the first application and/or the second application in a floating manner or a split-screen manner further includes the following. The electronic device displays an application interface of the second application on a current screen, and displays the first application in the floating point manner or the floating ball manner. Alternatively, the electronic device displays the application interface of the second in the application interface of the first application in the floating window manner. Alternatively, the electronic device displays the application interface of the first application and the application interface of the second application in the split-screen manner.

With reference to the first aspect, in some embodiments, when the touch operation is a single-tap operation, that the electronic device displays, in response to the touch operation, the first application and/or the second application in a floating manner or a split-screen manner based on an aspect ratio value of a screen of the electronic device includes the following. If the aspect ratio value of the screen of the electronic device is within a first value range, the electronic device switches the application interface of the first application to the application interface of the second application, or displays the application interface of the second application in a full-screen manner, and displays the first application in the floating point manner or the floating ball manner. If the aspect ratio value of the screen of the electronic device is within a second value range, the electronic device displays the application interface of the first application and the application interface of the second application in the split-screen manner, or the electronic device displays the application interface of the second application in the application interface of the first application in the floating window manner.

In this embodiment of this disclosure, a display manner that is currently most suitable for the currently running first application and the second application to which the displayed floating notification belongs is determined based on the aspect ratio value of the screen. This provides diversified application interface interaction manners, helps a user simultaneously view the two applications or quickly complete switching between the application interfaces of the two applications, and improves visual experience of the user.

With reference to the first aspect, in some embodiments, for an electronic device having a large screen or having a square screen (for example, a foldable mobile phone in an unfolded state), when the touch operation is a single-tap operation, the electronic device may display the application interface of the first application and the application interface of the second application in the horizontal split-screen manner, to facilitate a one-hand operation of the user. Further, the electronic device may obtain screen coordinates of the single-tap operation, and determine, based on the obtained screen coordinates, a screen area for displaying the application interface of the second application. For example, the electronic device determines whether the obtained screen coordinates are within a screen coordinate range of the left half screen or within a screen coordinate range of the right half screen to determine the screen area for displaying the application interface of the second application. For example, if the obtained screen coordinates are within the screen coordinate range of the left half screen, the application interface of the second application is displayed on the left half screen, and the application interface of the first application is displayed on the right half screen. If the obtained screen coordinates are within the screen coordinate range of the right half screen, the application interface of the second application is displayed on the right half screen, and the application interface of the first application is displayed on the left half screen.

With reference to the first aspect, in some embodiments, when the touch operation is a drag operation, that the electronic device displays, in response to the touch operation, the first application and/or the second application in a floating manner or a split-screen manner based on an aspect ratio value of a screen of the electronic device includes the following. If the aspect ratio value of the screen of the electronic device is within a first value range, the electronic device displays the application interface of the first application and the application interface of the second application in the vertical split-screen manner, or the electronic device displays, in the application interface of the first application, the application interface of the second application in an upper half screen area or a lower half screen area of the electronic device in the floating window manner. If the aspect ratio value of the screen of the electronic device is within a second value range, the electronic device displays the application interface of the first application and the application interface of the second application in the horizontal split-screen manner, or the electronic device displays, in the application interface of the first application, the application interface of the second application in a left half screen area or a right half screen area of the electronic device in the floating window manner.

According to a second aspect, an embodiment of this disclosure provides another application interface interaction method. With reference to the first aspect, the method includes the following. After the electronic device displays, in response to the touch operation, the first application and/or the second application in the floating manner or the split-screen manner based on the aspect ratio value of the screen of the electronic device, the method further includes the following. The electronic device detects a touch operation on the floating window, where the touch operation is a slide operation. In response to the slide operation, the electronic device hides the floating window, and displays, in the floating point manner or the floating ball manner, an application indicated by the floating window. For example, when a finger of a user slides from any one of four corners of the application interface of the first application displayed in the floating window toward a center of the application interface, the electronic device hides the floating window, and displays the first application in the interface of the second application in the floating point manner or the floating ball manner. In some other embodiments, when the electronic device is currently in a split-screen display state, that is, when the current screen displays the application interface of the first application and the application interface of the second application in the split-screen manner, the electronic device exits the split-screen display state when detecting a slide operation on an application interface of any one of the applications. If a movement track of the slide operation is within a screen coordinate range corresponding to the application interface of the first application, and the movement track and a movement direction of the slide operation meet a preset condition, the electronic device displays the application interface of the second application in the full-screen manner, and displays the first application in the floating point manner or the floating ball manner. For example, when a finger of a user slides from any one of four corners of the application interface toward a center of the application interface, the electronic device displays the second application in the full-screen manner, and displays the first application in the interface of the second application in the floating point manner or the floating ball manner, so that the user can quickly enter the application interface of the first application by using the floating point or the floating ball. If the movement track of the slide operation is within a screen coordinate range corresponding to the application interface of the first application, and the movement track and the movement direction of the slide operation meet the preset condition, the electronic device displays the application interface of the first application in the full-screen manner, and displays the second application in the floating point manner or the floating ball manner.

The preset condition is that a start point of the movement track of the slide operation is a preset location in the application interface, for example, any location in a range of upper left, lower left, upper right, and lower right corners of the application interface, and the movement direction is a preset direction, for example, a diagonal direction, to distinguish from an operation of sliding the screen by a user to display different display content. In this embodiment of this disclosure, based on a touch operation that meets the preset condition, an application may be switched from a split-screen display manner to a floating point manner or a floating ball manner, so that the user can conveniently view an application interface of the other application in a full-screen manner, to improve user experience.

According to a third aspect, an embodiment of this disclosure provides another application interface interaction method. With reference to the first aspect, the method includes the following. After the electronic device displays, in response to the touch operation, the first application and/or the second application in the floating manner or the split-screen manner based on the aspect ratio value of the screen of the electronic device, the method further includes the following. The electronic device detects a touch operation on the floating point or the floating ball, where the touch operation is any one of a tap operation, a press operation, or a touch and hold operation. In response to the touch operation, the electronic device switches an application interface currently displayed on the screen to an application interface of the application indicated by the floating point or the floating ball, and displays, in the floating manner, an application to which the application interface currently displayed on the screen belongs, or the electronic device displays, in the split-screen manner, the application interface of the application indicated by the floating point or the floating ball and the application interface currently displayed on the screen. For example, when an application is displayed on an application interface of another application by using a floating point or a floating ball, a user may press or touch and hold the floating point or the floating ball to quickly enter an application interface of the application indicated by the floating point or the floating ball, that is, the electronic device displays, in a split-screen manner or a floating window manner on the current screen, the application interface of the application indicated by the floating point or the floating ball. Further, when the floating point or the floating ball indicates the first application, the electronic device may display the first application in an application interface of the second application in the floating window manner, or may simultaneously display the application interface of the first application and the application interface of the second application on the current screen in the split-screen manner.

According to a fourth aspect, an embodiment of this disclosure provides another application interface interaction method, applied to an electronic device. The method includes the following. The electronic device displays a floating notification in an application interface of a first application. The electronic device detects a touch operation on the floating notification, where the touch operation is a slide operation. The electronic device displays, in response to the slide operation, a second application in a floating point manner or a floating ball manner. In this way, when a user subsequently wants to view an application interface of the second application, the user may quickly enter the application interface of the second application by touching a floating point or a floating ball that indicates the second application, to improve display efficiency of the application interface, and reduce a quantity of user operations.

According to a fifth aspect, an embodiment of this disclosure provides another application interface interaction method, applied to an electronic device (an electronic device whose screen cannot be folded). The method includes the following. The electronic device displays a floating notification in an application interface of a first application. The electronic device detects a touch operation on the floating notification, where the touch operation is a tap operation. In response to the tap operation, the electronic device displays an application interface of a second application in a full-screen manner, and displays the first application in a floating point manner or a floating ball manner. In this way, when a user subsequently wants to view the application interface of the first application, the user may quickly enter the application interface of the first application by touching a floating point or a floating ball that indicates the first application, to improve display efficiency of the application interface, and reduce a quantity of user operations.

According to a sixth aspect, this disclosure provides an electronic device. The electronic device includes one or more processors, a memory, and a display. The memory and the display are coupled to the one or more processors. The memory is configured to store computer program code, and the computer program code includes computer instructions. When the one or more processors execute the computer instructions, the electronic device is enabled to perform the method according to any one of the first aspect, the second aspect, the third aspect, the fourth aspect, the fifth aspect, the possible implementations of the first aspect, the possible implementations of the second aspect, the possible implementations of the third aspect, the possible implementations of the fourth aspect, or the possible implementations of the fifth aspect.

According to a seventh aspect, this disclosure provides a computer storage medium. The computer storage medium includes computer instructions. When the computer instructions are run on an electronic device, the electronic device is enabled to perform the method according to any one of the first aspect, the second aspect, the third aspect, the fourth aspect, the fifth aspect, the possible implementations of the first aspect, the possible implementations of the second aspect, the possible implementations of the third aspect, the possible implementations of the fourth aspect, or the possible implementations of the fifth aspect.

According to an eighth aspect, an embodiment of this disclosure provides a computer program product. When the computer program product runs on a computer, the computer is enabled to perform the method according to any one of the first aspect, the second aspect, the third aspect, the fourth aspect, the fifth aspect, the possible implementations of the first aspect, the possible implementations of the second aspect, the possible implementations of the third aspect, the possible implementations of the fourth aspect, or the possible implementations of the fifth aspect.

It may be understood that the electronic device according to the sixth aspect, the computer storage medium according to the seventh aspect, and the computer program product according to the eighth aspect that are provided above each are configured to perform the method according to any one of the first aspect, the second aspect, the third aspect, the fourth aspect, or the fifth aspect. Therefore, for beneficial effects that can be achieved, refer to beneficial effects in a corresponding method. Details are not described herein again.

BRIEF DESCRIPTION OF DRAWINGS

FIG. 2A to FIG. 2F are schematic diagrams of a group of forms obtained when a screen of an electronic device is a foldable display according to an embodiment of this disclosure; FIG. 2A is a schematic diagram of a form in which a foldable display with only one bending part is in an unfolded state according to an embodiment of this disclosure; FIG. 2B is a schematic diagram of a form in which a foldable display with two bending parts is in an unfolded state according to an embodiment of this disclosure; FIG. 2C and FIG. 2D each are a schematic diagram of a form in which the foldable display shown in FIG. 2A switches from a folded state to an unfolded state or switches from an unfolded state to a folded state according to an embodiment of this disclosure; and FIG. 2E and FIG. 2F each are a schematic diagram of a form in which the foldable display shown in FIG. 2B switches from a folded state to an unfolded state or switches from an unfolded state to a folded state according to an embodiment of this disclosure;

FIG. 5A is a schematic diagram of an application interface in which a user taps a floating notification that is of an application B and that is displayed in an application interface of a currently running application A; and FIG. 5B is a schematic diagram of an application interface displayed after the user taps the floating notification in FIG. 5A;

FIG. 6A is a schematic diagram of an application interface in which a user taps a floating notification 102 that is of an application B and that is displayed in an application interface of a currently running application A; and FIG. 6B and FIG. 6C are schematic diagrams of application interfaces displayed after the user taps the floating notification 102 in FIG. 6A;

FIG. 7A is a schematic diagram of an application interface in which a user drags a floating notification 102 that is of an application B and that is displayed in an application interface of a currently running application A; and FIG. 7B, FIG. 7C, and FIG. 7D are schematic diagrams of application interfaces displayed after the user drags the floating notification 102 in FIG. 7A to different locations;

FIG. 8A is a schematic diagram of an application interface in which a user drags a floating notification 102 that is of an application B and that is displayed in an application interface of a currently running application A; and FIG. 8B and FIG. 8C are schematic diagrams of application interfaces displayed after the user drags the floating notification 102 in FIG. 8A to different locations;

FIG. 10A is a schematic diagram of an application interface in which a user taps a floating ball 202 displayed in an application interface of a currently running application A; and FIG. 10B is a schematic diagram of an application interface displayed after the user taps the floating ball 202 in FIG. 10A;

FIG. 12A is a schematic diagram of an application interface in which a user slides in a preset direction in an application interface 201 that is of an application B and that is displayed in a split-screen manner; FIG. 12B is a schematic diagram of an application interface displayed after the user slides in the preset direction in the application interface 201 that is of the application B and that is displayed in the split-screen manner; and FIG. 12C is a schematic diagram of an application interface displayed after the user presses a floating ball 151 in FIG. 12B.

DESCRIPTION OF EMBODIMENTS

The following describes embodiments of this disclosure with reference to accompanying drawings in embodiments of this disclosure. Terms used in implementations of embodiments of this disclosure are merely used to explain specific embodiments of this disclosure, and are not intended to limit this disclosure.

Figure 1:
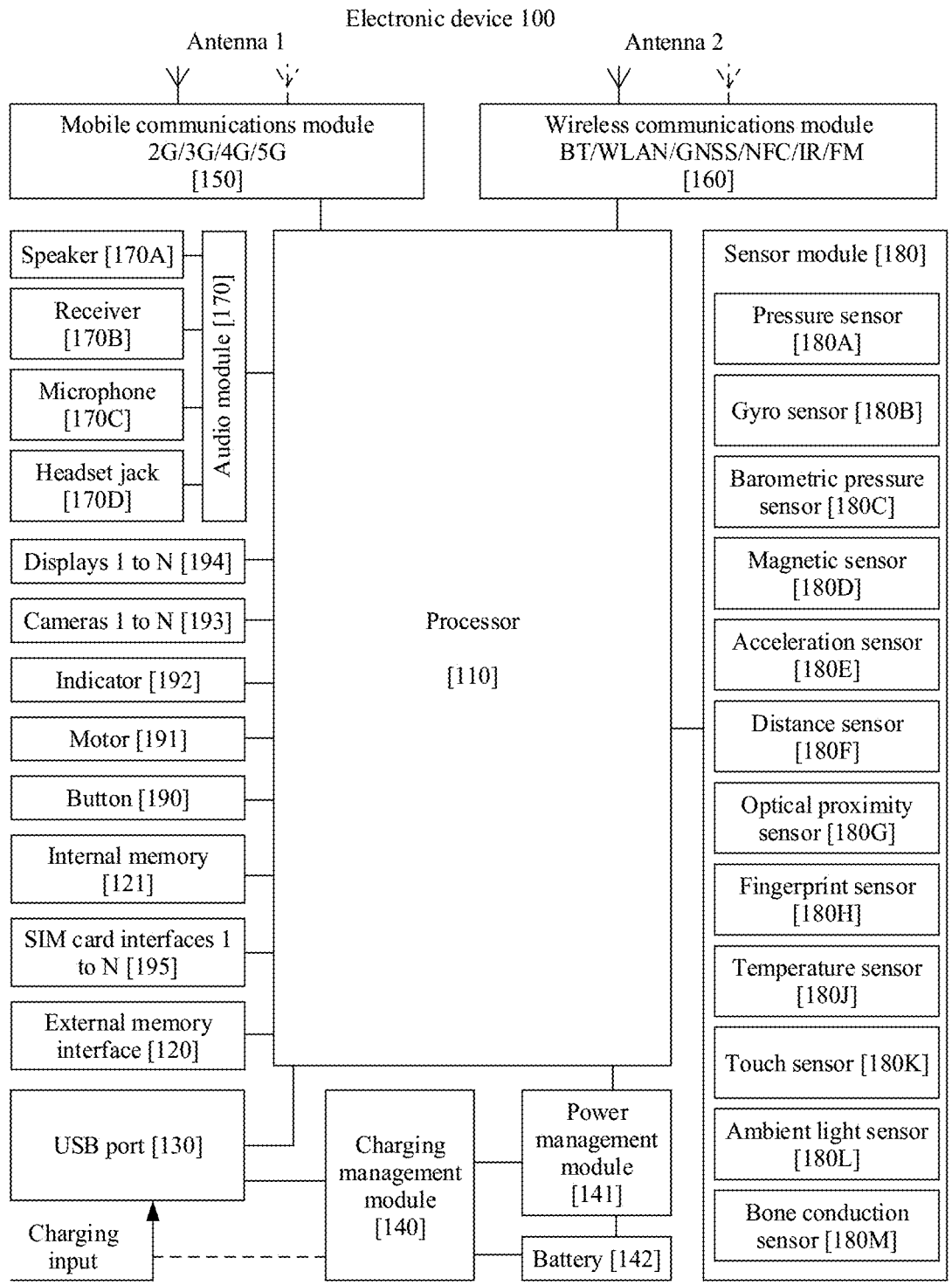
FIG. 1 is a schematic diagram of a structure of an electronic device according to an embodiment of this disclosure.

An electronic device in embodiments of this disclosure is first described. FIG. 1 is a schematic diagram of a structure of an electronic device 100 according to an embodiment of this disclosure.

The electronic device 100 may include a processor 110, an external memory interface 120, an internal memory 121, a Universal Serial Bus (USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of this disclosure does not constitute a specific limitation on the electronic device 100. In some other embodiments of this disclosure, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 requires to use the instructions or the data again, the processor 110 may directly invoke the instructions or the data from the foregoing memory. This avoids repeated access, reduces waiting time of the processor 110, and improves system efficiency.

In some embodiments, the processor 110 may include one or more interfaces. The interface may include an Inter-Integrated Circuit (I2C) interface, an I2C Sound (I2S) interface, a pulse-code modulation (PCM) interface, a universal asynchronous receiver/transmitter (UART) interface, a mobile industry processor interface (MIPI), a general-purpose input/output (GPIO) interface, a SIM interface, a USB port, and/or the like.

The I2C interface is a two-way synchronization serial bus, and includes one serial data line (SDL) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a BLUETOOTH (BT) headset.

The PCM interface may also be used to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement a function of answering a call by using a BT headset. Both the I2S interface and the PCM interface may be used for audio communication.

The UART interface is a universal serial data bus, and is configured to perform asynchronous communication. The bus may be a two-way communications bus. The bus converts to-be-transmitted data between serial communication and parallel communication. In some embodiments, the UART interface is usually configured to connect the processor 110 to the wireless communications module 160. For example, the processor 110 communicates with a BT module in the wireless communications module 160 through the UART interface, to implement a BT function. In some embodiments, the audio module 170 may transmit an audio signal to the wireless communications module 160 through the UART interface, to implement a function of playing music by using a BT headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI, to implement a photographing function of the electronic device 100. The processor 110 communicates with the display 194 through the DSI interface, to implement a display function of the electronic device 100.

The GPIO interface may be configured by software. The GPIO interface may be configured as a control signal or a data signal. In some embodiments, the GPIO interface may be configured to connect the processor 110 to the camera 193, the display 194, the wireless communications module 160, the audio module 170, the sensor module 180, or the like. The GPIO interface may alternatively be configured as the I2C interface, the I2S interface, the UART interface, the MIPI interface, or the like.

The USB port 130 is a port that conforms to a USB standard specification, and may be further a mini USB port, a micro USB port, a USB Type-C port, or the like. The USB port 130 may be configured to connect to a charger to charge the electronic device 100, or may be configured to perform data transmission between the electronic device 100 and a peripheral device. The USB port 130 may alternatively be configured to connect to a headset, to play an audio through the headset. The port may alternatively be configured to connect to another electronic device such as an augmented reality (AR) device.

It may be understood that an interface connection relationship between the modules shown in this embodiment of this disclosure is merely an example for description, and constitutes no limitation on the structure of the electronic device 100. In some other embodiments of this disclosure, the electronic device 100 may alternatively use an interface connection manner different from that in the foregoing embodiment, or use a combination of a plurality of interface connection manners.

The charging management module 140 is configured to receive a charging input from the charger. The charger may be a wireless charger or a wired charger. In some embodiments of wired charging, the charging management module 140 may receive a charging input of the wired charger through the USB port 130. In some embodiments of wireless charging, the charging management module 140 may receive a wireless charging input by using a wireless charging coil of the electronic device 100. The charging management module 140 supplies power to the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electricity leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further multiplexed, to improve antenna utilization. For example, the antenna 1 may be multiplexed as a diversity antenna of a wireless local area network. In some other embodiments, the antenna may be used in combination with a tuning switch.

The mobile communications module 150 may provide a wireless communication solution that includes second generation (2G)/third generation (3G)/fourth generation (4G)/fifth generation (5G) or the like and that is applied to the electronic device 100. The mobile communications module 150 may include at least one filter, a switch, a power amplifier, a low-noise amplifier (LNA), and the like. The mobile communications module 150 may receive an electromagnetic wave by using the antenna 1, perform processing such as filtering or amplification on the received electromagnetic wave, and transmit the electromagnetic wave to the modem processor for demodulation. The mobile communications module 150 may further amplify a signal modulated by the modem processor, and convert the signal into an electromagnetic wave by using the antenna 1 for radiation. In some embodiments, at least some functional modules in the mobile communications module 150 may be disposed in the processor 110. In some embodiments, at least some functional modules of the mobile communications module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate the received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker 170A, the receiver 170B, or the like), or displays an image or a video by using the display 194. In some embodiments, the modem processor may be an independent device. In some other embodiments, the modem processor may be independent of the processor 110, and is disposed in a same device as the mobile communications module 150 or another functional module.

The wireless communications module 160 may provide a wireless communication solution that includes a wireless local area network (WLAN) (for example, a WI-FI network, BT, a global navigation satellite system (GNSS), frequency modulation (FM), a near-field communication (NFC) technology, an infrared (IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave by using the antenna 2 for radiation.

In some embodiments, in the electronic device 100, the antenna 1 and the mobile communications module 150 are coupled, and the antenna 2 and the wireless communications module 160 are coupled, so that the electronic device 100 can communicate with a network and another device by using a wireless communications technology. The wireless communications technology may include a Global System for Mobile Communications (GSM), a General Packet Radio Service (GPRS), code-division multiple access (CDMA), wideband CDMA (WCDMA), time-division CDMA (TD-SCDMA), Long-Term Evolution (LTE), BT, a GNSS, a WLAN, NFC, FM, an IR technology, and/or the like. The GNSS may include a Global Positioning System (GPS), a global navigation satellite system (GLONASS), a BEIDOU navigation satellite system (BDS), a Quasi-Zenith satellite system (QZSS), and/or a satellite based augmentation system (SBAS).

The electronic device 100 implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs that execute program instructions to generate or change display information.

The display 194 is configured to display an image, a video, and the like. The display 194 includes a display panel. The display panel may be a liquid-crystal display (LCD), an organic light-emitting diode (LED) (OLED), an active-matrix OLED (AMOLED), a flexible LED (FLED), a mini-LED, a micro-LED, a micro-OLED, a quantum dot LED (QLED), or the like. In some embodiments, the electronic device 100 may include one or N displays 194, where N is a positive integer greater than 1.

In some embodiments, when the display panel is made of a material such as an OLED, an AMOLED, or an FLED, the display 194 shown in FIG. 1 can be bent. Herein, that the display 194 can be bent means that the display can be bent to any angle at any part and may be maintained at the angle. For example, the display 194 may be folded left and right from the middle, or may be folded up and down from the middle. In this embodiment of this disclosure, the display that can be bent is referred to as a foldable display. The foldable display may be one screen, or may be a display formed by combining a plurality of screens. This is not limited herein.

Figure 2B:
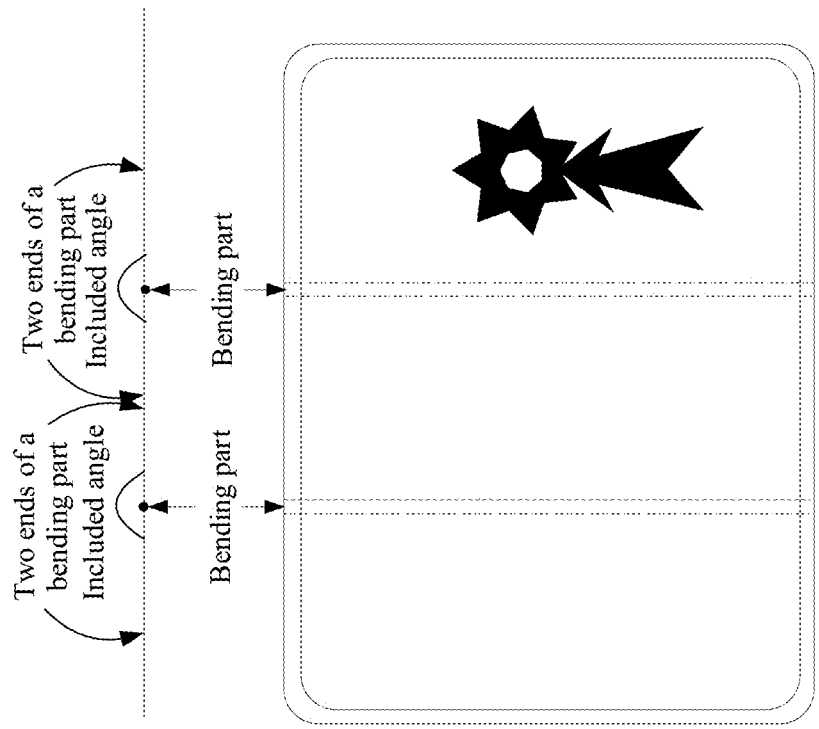
Figure 2A:
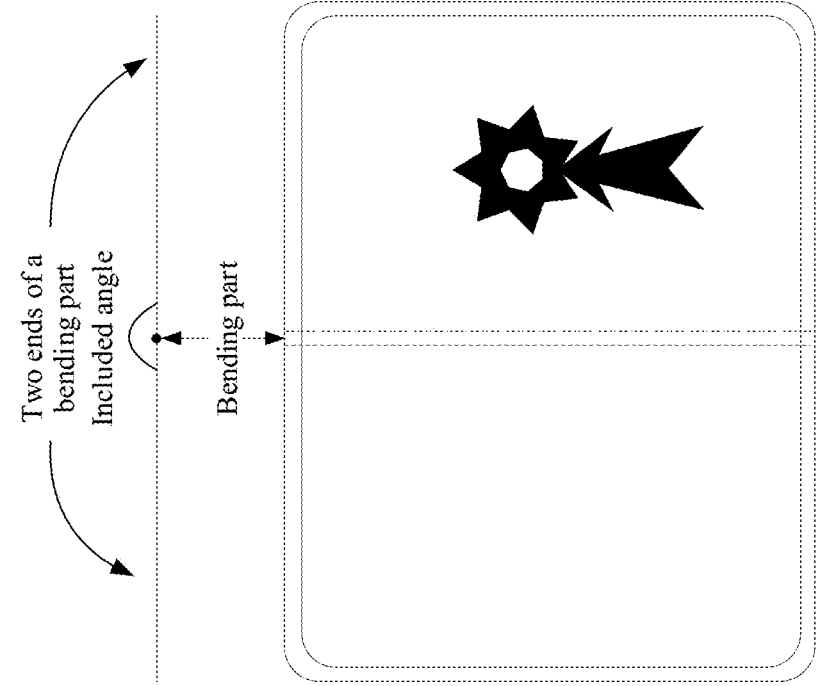
Figure 2D:
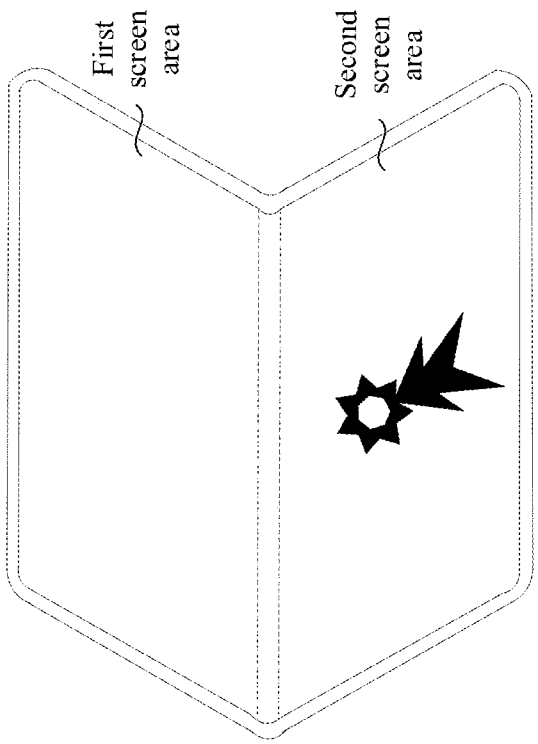
Figure 2C:
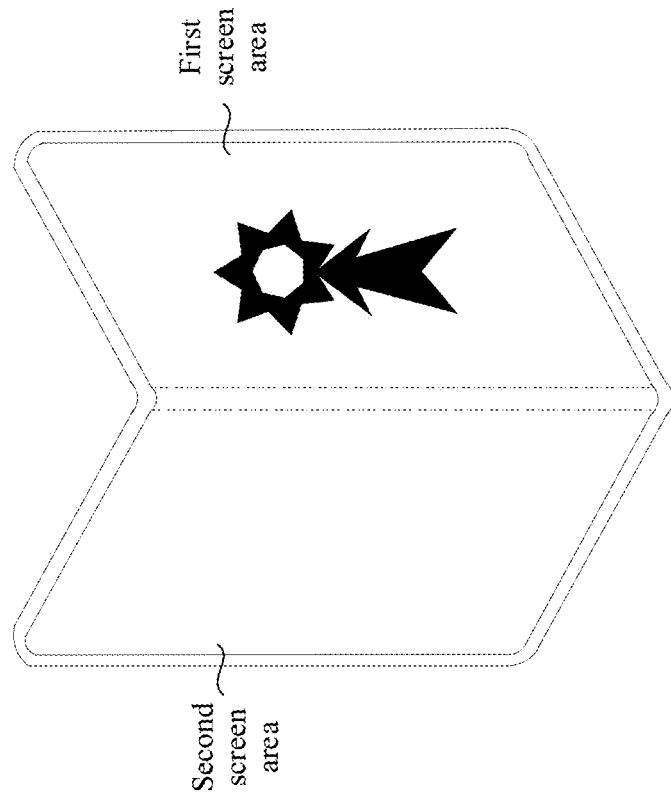

For example, refer to FIG. 2A to FIG. 2F. A foldable display may include at least two physical forms: an unfolded form and a folded form. As shown in FIG. 2A, the foldable display is in the unfolded form, that is, an included angle between left and right ends of a middle bending part that is of the foldable display and from which the foldable display may be folded leftward or rightward (or between upper and lower ends of a middle bending part of the foldable display if the foldable display is folded upward or downward) ranges from a first angle to 180 degrees, where the first angle is greater than0 degrees and less than 180 degrees. For example, the first angle may be 90 degrees. As shown in FIG. 2B, the foldable display is in the unfolded form, that is, included angles between left and right ends of bending parts that are ⅓ and ⅔ of the foldable display and from which the foldable display may be folded leftward or rightward (or between upper and lower ends of bending parts that are ⅓ and ⅔ of the foldable display if the foldable display is folded upward or downward) each range from a first angle to 180 degrees, where the first angle is greater than0 degrees and less than 180 degrees. For example, the first angle may be 90 degrees. As shown in FIG. 2C and FIG. 2D, the foldable display may alternatively be in the folded form, that is, the included angle between the left and right ends of the middle bending part of the foldable display (or between the upper and lower ends of the middle bending part of the foldable display if the foldable display is folded upward or downward) ranges from0 degrees to a first angle. As shown in FIG. 2E and FIG. 2F, the foldable display may alternatively be in the folded form, that is, the included angles between the left and right ends of the bending parts that are ⅓ and ⅔ of the foldable display (or between the upper and lower parts of the bending parts that are ⅓ and ⅔ of the foldable display if the foldable display is folded upward or downward) each range from 0 degrees to a first angle.

As shown in FIG. 2C and FIG. 2D, the foldable display is a foldable display with only one bending part, and a display area of the foldable display obtained after entering the folded form may be divided into a first screen area and a second screen area. In the unfolded form, the foldable display may be folded in a direction in which the first screen area and the second screen area face each other, or may be folded in a direction in which the first screen area and the second screen area are opposite to each other. In some embodiments, the included angle between the left and right ends of the middle bending part of the foldable display (or between the upper and lower ends of the middle bending part of the foldable display if the foldable display is folded upward or downward) may range from0 degrees to +180 degrees. For example, the foldable display may be bent in a direction in which the first screen area and the second screen area face each other to be in a folded form with an included angle of 30 degrees, or may be bent in a direction in which the first screen area and the second screen area are opposite to each other to be in a folded form with an included angle of 30 degrees.

As shown in FIG. 2E and FIG. 2F, the foldable display is a foldable display with two bending parts, and a display area of the foldable display obtained after entering the folded form may be divided into a first screen area, a second screen area, and a third screen area. In the unfolded form, the foldable display may be folded in a direction in which the first screen area and the second screen area face each other and the second screen area and the third screen area are opposite to each other, or may be folded in a direction in which the first screen area and the second screen area are opposite to each other and the second screen area and the third screen area face each other.

In some embodiments, the electronic device 100 may determine, by using one or more of a gravity sensor, an acceleration sensor, and a gyro, whether the foldable display is in a folded form or an unfolded form, and may further determine whether the foldable display is in a portrait mode or a landscape mode. The electronic device 100 may further detect, by using the gravity sensor, the acceleration sensor, and the gyro, an included angle of a bending part of the foldable display, and then the electronic device 100 may determine, based on the included angle of the bending part, whether the foldable display is in the folded form or in the unfolded form. The electronic device 100 may further determine, by using one or more of the gravity sensor, the acceleration sensor, and the gyro, an orientation of the foldable display in the folded form, and further determine a display area of interface content output by a display system. For example, when a first screen area of the foldable display faces upward relative to the ground, the electronic device 100 may display, on the first screen area, the interface content output by the display system. When a second screen area of the foldable display faces upward relative to the ground, the electronic device 100 may display, on the second screen area, the interface content output by the display system.

The electronic device 100 may implement a photographing function by using the ISP, the camera 193, the video codec, the GPU, the display 194, the application processor, and the like.

The ISP is configured to process data fed back by the camera 193. For example, during photographing, a shutter is opened, and light is transferred to a photosensitive element of the camera through a lens. An optical signal is converted into an electrical signal, and the photosensitive element of the camera transfers the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 193.

The camera 193 may be configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as red, green, and blue (RGB) or luma, blue projection, and red projection (YUV). In some embodiments, the electronic device 100 may include one or N cameras 193, where N is a positive integer greater than 1.

The digital signal processor is configured to process a digital signal, and may process another digital signal in addition to processing the digital image signal. For example, when the electronic device 100 selects a frequency, the digital signal processor is configured to perform Fourier transform on frequency energy, and the like.

The video codec is configured to compress or decompress a digital video. The electronic device 100 may support one or more video codecs. In this way, the electronic device 100 may play or record videos in a plurality of coding formats, for example, Moving Picture Experts Group (MPEG) 1, MPEG 2, MPEG 3, and MPEG 4.

The NPU is a neural-network (NN) computing processor. The NPU quickly processes input information by referring to a structure of a biological neural network, for example, with reference to a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be used to connect to an external storage card, for example, a Micro Secure Digital (SD) card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121, to perform various function applications of the electronic device 100 and data processing. The internal memory 121 may include a program storage area and a data storage area. The program storage area may store an operating system, an application required by at least one function (for example, a sound play function and an image play function), and the like. The data storage area may store data (for example, audio data and an address book) and the like created during use of the electronic device 100. In addition, the internal memory 121 may include a high-speed random-access memory (RAM), and may further include a nonvolatile memory, for example, at least one magnetic disk storage device, a flash memory device, a Universal Flash Storage (UFS), and the like.

The electronic device 100 may implement an audio function such as music playing or recording by using the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "horn", is configured to convert an audio electrical signal into a sound signal. The electronic device 100 may listen to music or answer a hands-free call by using the speaker 170A.

The receiver 170B, also referred to as an "earpiece", is configured to convert the audio electrical audio signal into the sound signal. When a call is answered or voice information is received by using the electronic device 100, the receiver 170B may be put close to a human ear to listen to a voice.

The microphone 170C, also referred to as a "mike" or a "mic", is configured to convert a sound signal into an electrical signal. When making a call or sending voice information, a user may make a sound near the microphone 170C through the mouth of the user, to input the sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, further identify a sound source, implement a directional recording function, and the like.

The headset jack 170D is configured to connect to a wired headset. The headset jack 170D may be the USB port 130, or may be a 3.5 millimeter (mm) Open Mobile Terminal Platform (OMTP) standard interface or a Cellular Telecommunications Industry Association of the United States of America (USA) (CTIA) standard interface.

The pressure sensor 180A is configured to sense a pressure signal, and may convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on the change in the capacitance. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed at a same touch location but have different touch operation intensity may correspond to different operation instructions. For example, when a touch operation whose touch operation intensity is less than a first pressure threshold is performed on a Messages application icon, an instruction for viewing a Short Message Services (SMS) message is executed. When a touch operation whose touch operation intensity is greater than or equal to the first pressure threshold is performed on the messages application icon, an instruction for creating a new SMS message is performed.

The gyro sensor 180B may be configured to determine a motion posture of the electronic device 100. In some embodiments, an angular velocity of the electronic device 100 around three axes (namely, axes x, y, and z) may be determined by using the gyro sensor 180B. The gyro sensor 180B may be configured to implement image stabilization during photographing. For example, when a shutter is pressed, the gyro sensor 180B detects an angle at which the electronic device 100 jitters, obtains, through calculation based on the angle, a distance for which a lens module requires to compensate, and allows the lens to cancel the jitter of the electronic device 100 through reverse motion, to implement image stabilization. The gyro sensor 180B may be further used in navigation and motion sensing game scenarios.

The barometric pressure sensor 180C is configured to measure barometric pressure. In some embodiments, the electronic device 100 calculates an altitude by using a value of the barometric pressure measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover based on the magnetic sensor 180D, and further set, based on a detected opening or closing state of the flip cover, a feature such as automatic unlocking of the flip cover.

The acceleration sensor 180E may detect accelerations in various directions (usually on three axes) of the electronic device 100, and may detect magnitude and a direction of gravity when the electronic device 100 is static. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance through the distance sensor 180F to implement quick focusing.

The optical proximity sensor 180G may include, for example, an LED and an optical detector, for example, a photodiode. The LED may be an infrared LED. The electronic device 100 emits infrared light by using the LED. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically perform screen unlocking or locking.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 lowers performance of a processor nearby the temperature sensor 180J, to reduce power consumption to implement thermal protection. In some other embodiments, when the temperature is less than another threshold, the electronic device 100 heats the battery 142 to prevent the electronic device 100 from being shut down abnormally due to a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor to determine a type of a touch event. A visual output related to the touch operation may be provided by using the display 194. In some other embodiments, the touch sensor 180K may also be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in a headset, to form a bone conduction headset. The audio module 170 may parse out a voice signal based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt, or may be configured to provide a touch vibration feedback. For example, touch operations performed on different applications (for example, photographing and audio play) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator lamp, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may also be compatible with an external storage card. The electronic device 100 interacts with a network through the SIM card, to implement functions such as conversation and data communication. In some embodiments, the electronic device 100 uses an eSIM, that is, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In embodiments of this disclosure, an ANDROID system with a layered architecture is used as an example to describe a software structure of the electronic device 100.

Figure 3:
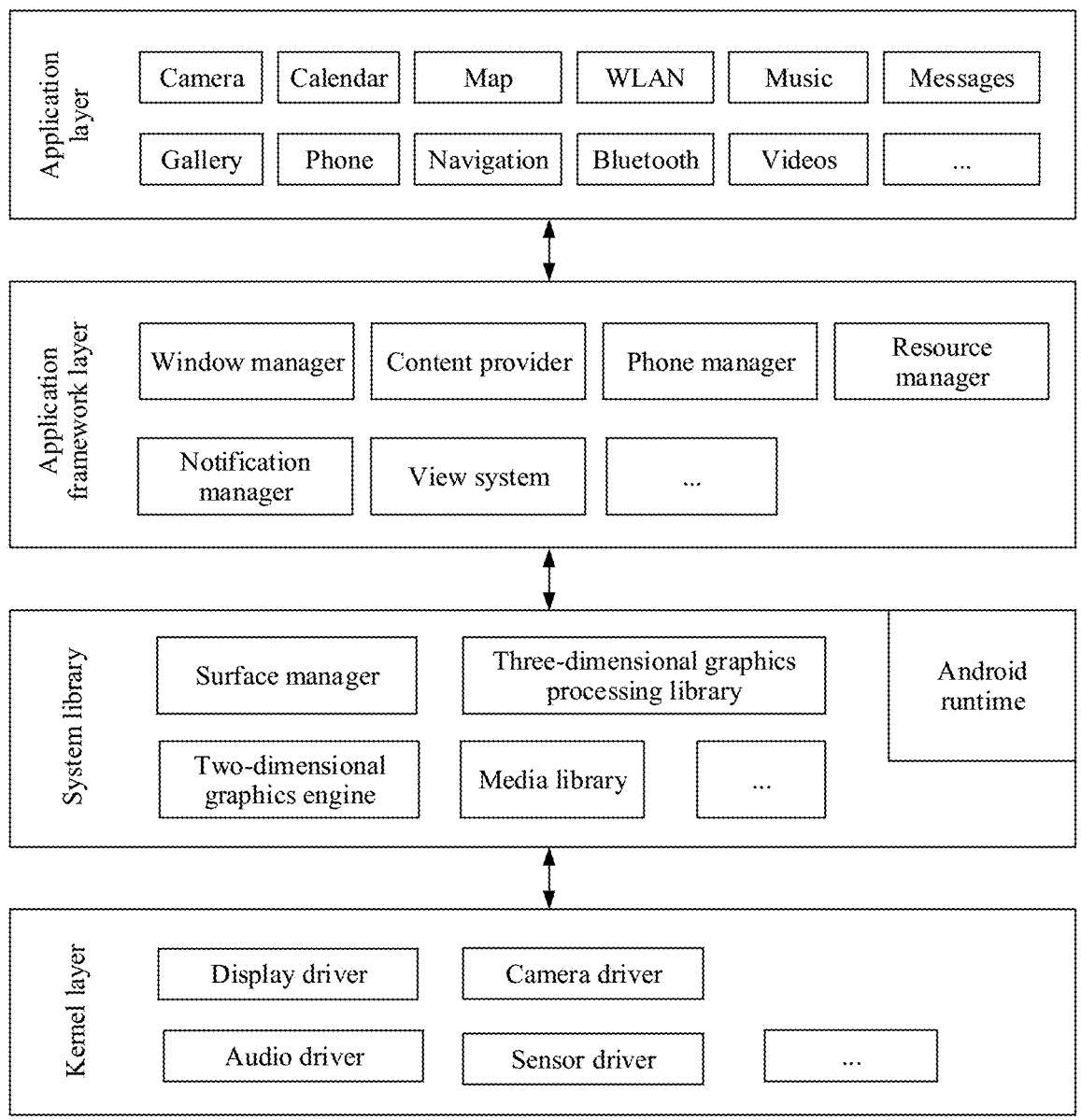
FIG. 3 is a block diagram of a software structure of an electronic device according to an embodiment of this disclosure.

FIG. 3 is a block diagram of a software structure of an electronic device 100 according to an embodiment of this disclosure.

In the layered architecture, software is divided into several layers, and each layer has a clear role and task. The layers communicate with each other through a software interface. In some embodiments, the ANDROID system is divided into four layers: an application layer, an application framework layer, an ANDROID runtime and system library, and a kernel layer from top to bottom.

The application layer may include a series of application packages.

As shown in FIG. 3, the application packages may include applications such as camera, gallery, calendar, phone, map, navigation, WLAN, BT, music, videos, and messages.

The application framework layer provides an application programming interface (API) and a programming framework for an application at the application layer. The application framework layer includes some predefined functions.

As shown in FIG. 3, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, an audio, calls that are made and received, a browsing history and bookmarks, an address book, and the like.

The view system includes visualized controls such as a control for displaying text and a control for displaying an image. The view system may be configured to construct an application. A display interface may include one or more views. For example, a display interface including a Messages notification icon may include a text display view and an image display view.

The phone manager is configured to provide a communication function of the electronic device 100, for example, management of a call status (including answering, declining, or the like).

The resource manager provides various resources such as a localized character string, an icon, an image, a layout file, and a video file for an application.

The notification manager enables an application to display notification information in a status bar, and may be configured to convey a notification message. The notification manager may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running on the background, or may be a notification that appears on the display in a form of a dialog window. For example, text information is displayed in the status bar, an alert sound is played, the electronic device vibrates, or an indicator lamp blinks.

The ANDROID runtime includes a core library and a virtual machine. The ANDROID runtime is responsible for scheduling and management of the ANDROID system.

The core library includes two parts: a performance function to be invoked by Java language, and an ANDROID core library.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional (3D) graphics processing library (for example, OpenGL Embedded System (ES)), and a two-dimensional (2D) graphics engine (for example, SGL).

The surface manager is configured to manage a display subsystem and provide fusion of 2D and 3D layers for a plurality of applications.

The media library supports playback and recording of audio and videos in a plurality of commonly used formats, static image files, and the like. The media library may support a plurality of audio and video coding formats, for example, MPEG-4, H.264, MPEG-1 Audio Layer III or MPEG-2 Audio Layer III (MP3), Advanced Audio Coding (AAC), Adaptive Multi-Rate (AMR), Joint Photographic Experts Group (JPEG), and Portable Network Graphics (PNG).

The 3D graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a capture photographing scenario.

When the touch sensor 180K receives a touch operation, a corresponding hardware interruption is sent to the kernel layer. The kernel layer processes the touch operation into an original input event (including information such as touch coordinates and a time stamp of the touch operation). The original input event is stored at the kernel layer. The application framework layer obtains the original input event from the kernel layer, and identifies a control corresponding to the input event. For example, the touch operation is a single-tap touch operation, and a control corresponding to the single-tap operation is a control of a camera application icon. A camera application invokes an interface of the application framework layer to open the camera application, then enables the camera driver by invoking the kernel layer, and captures a static image or a video by using the camera 193.

In some scenarios, in a process in which a user uses the electronic device 100, when the user is immersed in an application currently displayed on the electronic device 100 and is interrupted by a notification reminder of another application, the user taps a pop-up window of the notification reminder, to view notification details. After the user views the notification details, if the user expects to return to an application interface of the current application, the user needs to first exit an application interface of the application to which the notification details belong, enter a recent task interface or return to a home screen to find the current application, and then tap the current application to enter the corresponding application interface. It is necessary to conveniently switch between the current application and the application to which the notification details belong to display a corresponding application interface, reduce a quantity of user operations, and improve user experience.

In some other application scenarios, on some electronic devices 100 with large screens, when an application currently displayed on the electronic device 100 is interrupted by a notification reminder of another application, the electronic device 100 automatically opens the application to which the notification reminder belongs, and automatically displays, on a current screen in a split-screen manner, the currently displayed application and the application to which the notification reminder belongs, to help a user simultaneously view application interfaces of the two applications. However, for an electronic device 100 with a small screen, if two applications are simultaneously displayed on the screen, visual experience of the user may be reduced, and a personalized need of the user is not comprehensively considered.

Especially, for an electronic device 100 whose display is a foldable display, when the foldable display is in a folded state, an aspect ratio of a screen currently used by a user is close to an aspect ratio of a screen of a conventional mobile phone (a mobile phone with a small screen), for example, the aspect ratio is close to 2:1. For example, the aspect ratio of the current screen is 18:9, 21:9, 16:9, or 19.5:9. In this case, the current screen is suitable for displaying an application interface of one application. When the foldable display is in an unfolded state, the aspect ratio of the screen currently used by the user is close to 1:1. For example, the aspect ratio of the current screen is 8:7.1, 1:1, or 4:3. In this case, the current screen is suitable for simultaneously displaying application interfaces of two or more applications. An embodiment of this disclosure provides an application interface interaction method, to fully use a display feature of a foldable display, conveniently switch between a current application and an application to which notification details belong to display a corresponding application interface, reduce a quantity of user operations, and improve visual experience of a user.

Figure 4:
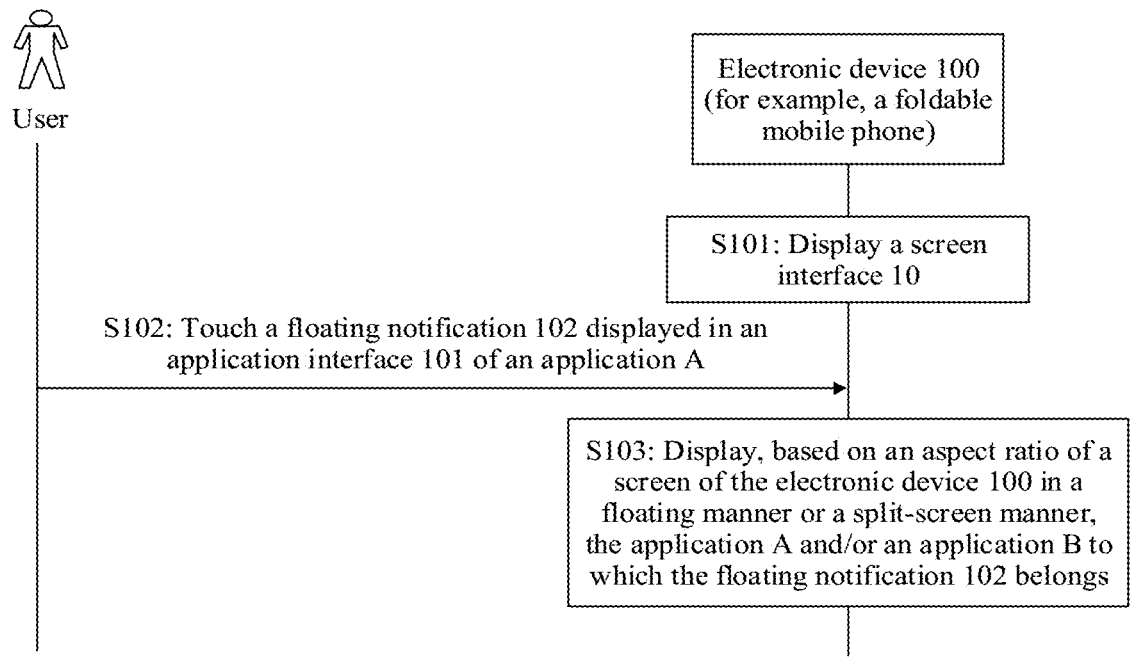
FIG. 4 is a schematic flowchart of an application interface interaction method according to an embodiment of this disclosure.

FIG. 4 is a schematic flowchart of an application interface interaction method according to an embodiment of this disclosure. As shown in FIG. 4, the method includes steps S101 to S103.

S101: An electronic device 100 displays a screen interface 10.

Figures 5A, 5B:
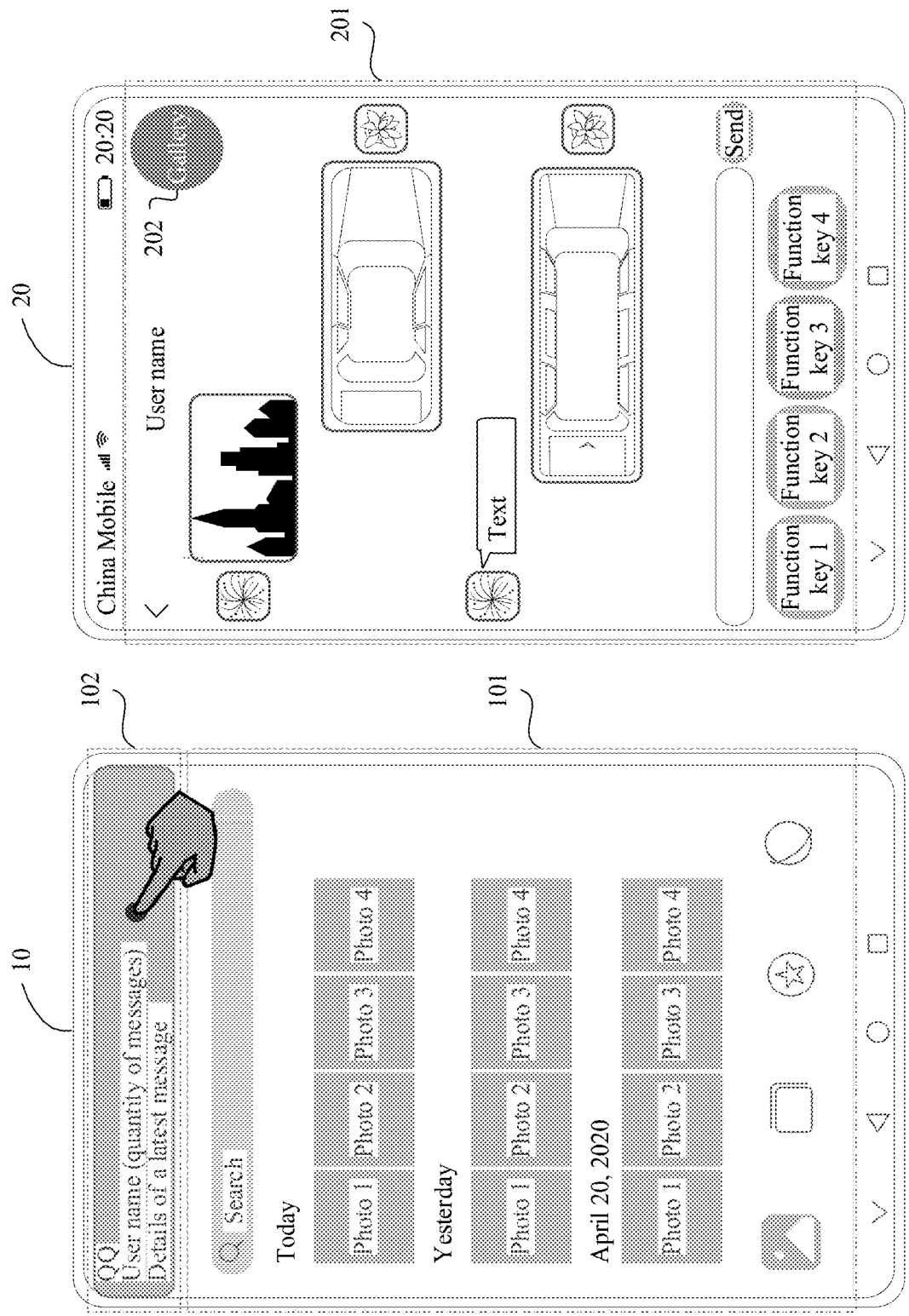
FIG. 5A and FIG. 5B are schematic diagrams of an application interface according to an embodiment of this disclosure.

FIG. 5A and FIG. 5B schematic diagrams of an application interface according to an embodiment of this disclosure. As shown in FIG. 5A, an application interface 101 of an application A (for example, Gallery) currently running on the electronic device 100 is displayed in the screen interface 10. When an application B (for example, QQ or WECHAT) installed in the electronic device 100 receives information, the electronic device 100 displays, in the application interface 101 of the currently running application A, a floating notification 102 indicating the application B that receives the information, where the floating notification 102 is used to indicate the information received by the application B during running of the application A.

It should be noted that the floating notification 102 in this embodiment of this disclosure may be a notification box that includes information and that is displayed in a pop-up window form. The floating notification is hidden after being displayed in the application interface of the application A for preset duration, for example, 2 seconds. Within the preset duration, a user may perform a touch operation (for example, a tap operation, a drag operation, or a slide operation) on the floating notification, so that the electronic device 100 displays, based on the corresponding touch operation, the application B to which the floating notification belongs.

It should be further noted that the application A is any application that has been installed in the electronic device 100, and the application B is any application other than the application A that has been installed in the electronic device 100. In some embodiments, the application A and the application B may also be represented by a first application and a second application. The terms "first" and "second" have no special meaning, and are merely used to distinguish between two different applications.

S102: The electronic device 100 detects the touch operation performed by the user on the floating notification 102.

S103: The electronic device 100 displays, based on an aspect ratio value of a screen of the electronic device 100 in a floating manner or a split-screen manner, the application A and/or the application B to which the floating notification 102 belongs.

As shown in FIG. 5A, the application interface 101 of the application A is displayed on a current screen of the electronic device 100. When the user performs a tap operation on the floating notification 102 displayed by the electronic device 100 when the application B receives new information, that is, when the user taps the floating notification 102, the electronic device 100 detects the tap operation performed by the user on the floating notification 102, and in response to the tap operation, the electronic device 100 obtains an aspect ratio of the screen, and calculates the aspect ratio value of the screen, to determine, based on the calculated aspect ratio value of the screen, whether to display the application B in the floating manner or display the application interface 101 of the application A and an application interface 102 of the application B in the split-screen manner.

In this embodiment of this disclosure, the aspect ratio value of the screen of the electronic device 100 is a value calculated based on the aspect ratio of the screen of the electronic device 100. For example, when the aspect ratio of the screen of the electronic device 100 is 18:9, the calculated aspect ratio value is 2. For another example, when the aspect ratio of the screen of the electronic device 100 is 21:9, the calculated aspect ratio value is 2.33. For another example, when the aspect ratio of the screen of the electronic device 100 is 4:3, the calculated aspect ratio value is 1.3.

In this embodiment of this disclosure, the floating manner is that a virtual key that indicates an application or an application interface is displayed on the top of the screen in a floating state, and includes a floating point manner, a floating ball manner, and a floating window manner. The floating point manner is that a dot-shaped virtual key that indicates an application is displayed on the top of the screen in a floating state. The floating ball manner is that a spherical virtual key that indicates an application is displayed on the top of the screen in a floating state. The floating window manner is that a window that corresponds to an application interface of an application is displayed on the top of the screen in a floating state.

In this embodiment of this disclosure, a virtual key indicating an application in the floating point manner is set as a floating point, a virtual key indicating an application in the floating ball manner is set as a floating ball, and in response to the touch operation, a virtual key corresponding to an application interface of an application in the floating window manner is set as a floating window. The floating point, the floating ball, and the floating window may be randomly dragged to any location in a display area of the electronic device.

The floating point is represented as a dot-shaped virtual key. The virtual key may include a name, a name abbreviation, or the like of an application indicated by the floating point, for example, Alarm or Email, so that the user clearly knows the application indicated by the virtual key, to improve user experience. Floating balls are represented as virtual keys in various shapes, for example, virtual keys in a spherical shape, a circle shape, and a diamond shape. In some embodiments, the floating balls are represented as virtual keys in various shapes formed based on icons corresponding to applications indicated by the floating balls. For example, a floating ball indicating an application "Huawei AppGallery" may be represented as a spherical icon "Huawei AppGallery". The spherical icon is displayed on the top of the screen in a form of a virtual key. The floating window manner means that an application interface of an application is displayed on the current screen in a form of a window in a floating manner. When an application interface of an application is displayed on the screen in a form of a window, the window is referred to as the floating window in this embodiment of this disclosure.

It should be noted that when the electronic device 100 displays the application B in a floating manner, a screen area in which the application interface 101 of the application A is displayed does not change, that is, the application interface 101 of the application A remains unchanged, and a floating point or a floating ball indicating the application B is displayed on the top of a screen of the application interface 101, or the application interface of the application B is displayed in a floating window on the top of the screen of the application interface 101.

The split-screen manner is that application interfaces displayed by the electronic device 100 are independently displayed in different screen areas. For example, the application A is displayed in a first screen area (for example, an upper half screen or a left half screen), and the application B is displayed in a second screen area (for example, a lower half screen or a right half screen). The split-screen manner includes but is not limited to a vertical split-screen manner and a horizontal split-screen manner. The vertical split-screen manner is dividing the display area of the electronic device 100 into two screen areas: an upper half screen and a lower half screen, and the horizontal split-screen manner is dividing the display area of the electronic device 100 into two screen areas: a left half screen and a right half screen.

In a specific embodiment, the current screen of the electronic device 100 displays only the application interface of the application A. When the electronic device 100 displays the application A and the application B in a split-screen manner, the electronic device 100 divides the display area of the current screen into the first screen area (for example, the upper half screen or the left half screen) and the second screen area (for example, the lower half screen or the right half screen), displays the application interface of the application A in the first screen area or the second screen area, and displays the application interface of the application B in the other screen area.

In this embodiment of this disclosure, the electronic device 100 may display the application interface of the application B on the current screen, and display the application A in the floating point manner or the floating ball manner, may display the application interface of the application B in the application interface of the application A in the floating window manner, or may display the application interface of the application A and the application interface of the application B on the current screen in the split-screen manner.

In some embodiments, when the touch operation is a tap operation, if the aspect ratio value of the screen of the electronic device 100 is within a first value range, the electronic device switches the application interface of the application A to the application interface of the application B, or displays the application interface of the second application in a full-screen manner, and displays the application A in the floating point or the floating ball manner.

As shown in FIG. 5B, when the aspect ratio value of the screen is within the first value range, for example, [1.5 to 2.5], that is, when the aspect ratio value of the screen of the electronic device 100 is close to 2, it indicates that the foldable display of the electronic device 100 is in a folded state. The electronic device switches the application interface 101 of the application A currently displayed on the screen of the electronic device 100 to an application interface 201 of the application B, and displays the application A on the screen of the electronic device 100 by using a floating ball 202, to facilitate switching between different applications, and improve visual experience of a user. The floating ball 202 may alternatively be a floating point. In some embodiments, the application interface 201 of the application B may be displayed in a full-screen manner, and the floating ball 202 indicating the application A is displayed in the application interface 201 of the application B.

In some other embodiments, when the touch operation is a tap operation, if the aspect ratio value of the screen of the electronic device is within a second value range, the electronic device displays the application interface 101 of the application A and the application interface 201 of the application B in a split-screen manner.

Figure 6A:
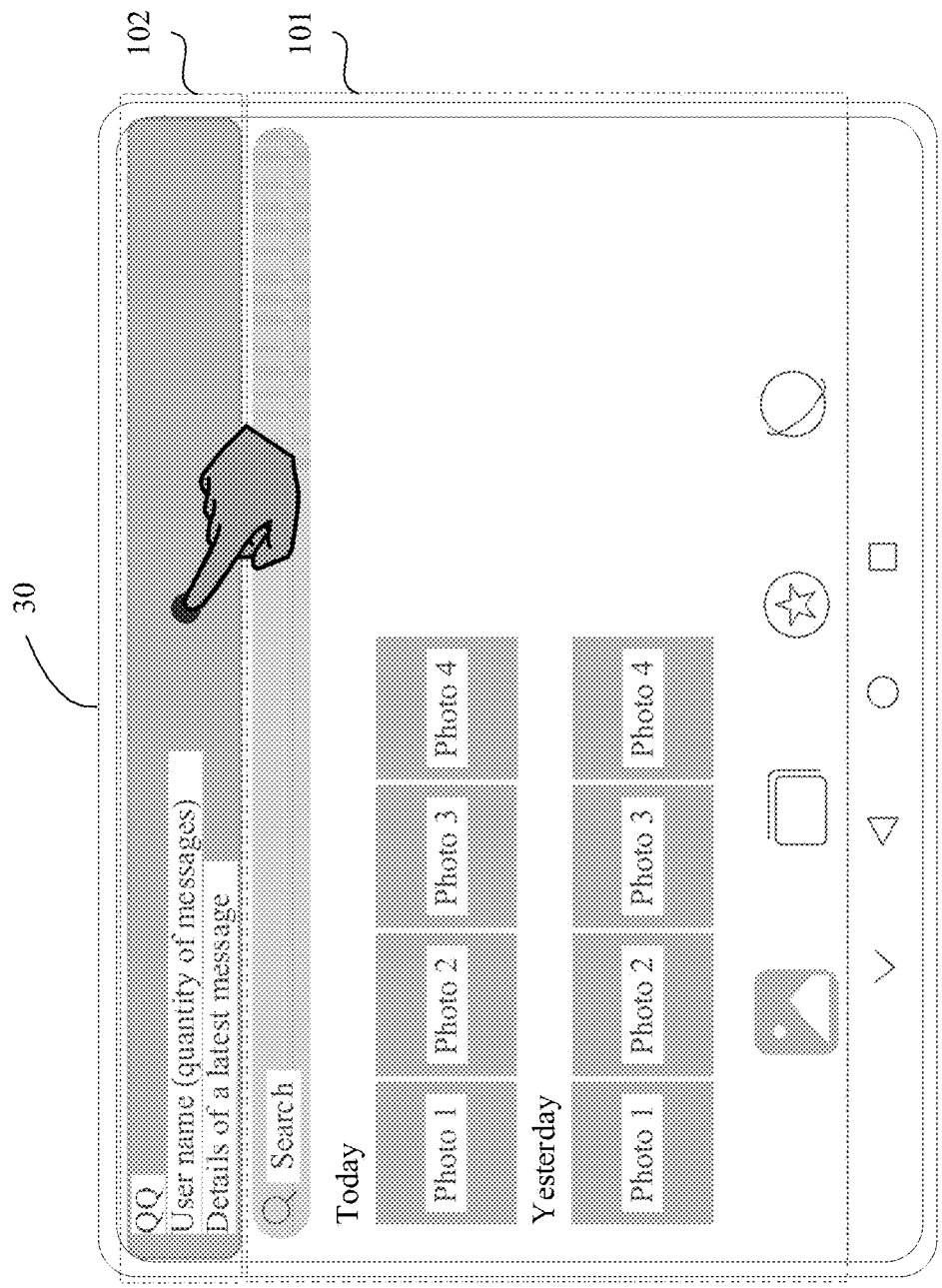
FIG. 6A, FIG. 6B, and FIG. 6C are schematic diagram of another application interface according to an embodiment of this disclosure.
Figure 6B:
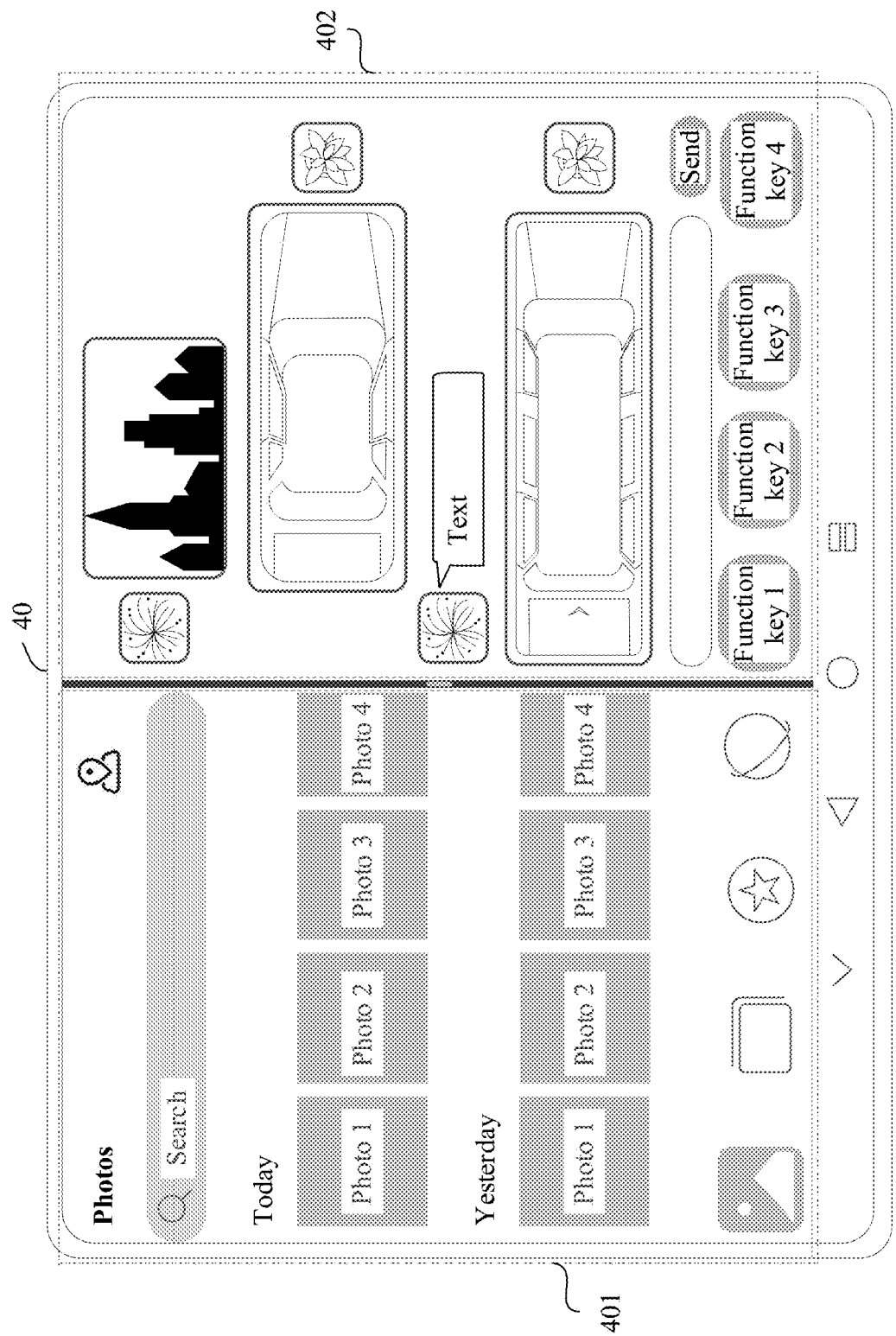

As shown in FIG. 6A, the application interface 101 of the application A is displayed on a current screen of the electronic device 100. When a user performs a tap operation on the floating notification 102 displayed on the electronic device 100, the electronic device 100 detects the tap operation performed by the user on the floating notification 102, and in response to the tap operation, the electronic device 100 obtains an aspect ratio of the screen, and learns, through calculation, that an aspect ratio value of the screen is within a second value range, for example, [1 to 1.4]. That is, when the aspect ratio value of the screen of the electronic device 100 is close to 1, it indicates that the foldable display of the electronic device 100 is in an unfolded state, and the current screen is suitable for displaying application interfaces of two or more applications. The electronic device 100 divides a display area of the electronic device into two screen areas, select one screen area to display the application interface 101 of the application A, and select the other screen area to display the application interface of the application B, to fully use display efficiency of the electronic device 100, improve efficiency of interaction between the application interfaces, and help the user simultaneously view the application interfaces of the two or more applications. As shown in FIG. 6B, the electronic device 100 randomly selects one screen area to display the application interface 101 of the application A, and selects the other screen area to display the application interface of the application B to which the floating notification 102 belongs. For example, the electronic device 100 displays the application interface 101 of the application A in a first screen area 401, and displays the application interface of the application B in a second screen area 402.

Figure 6C:
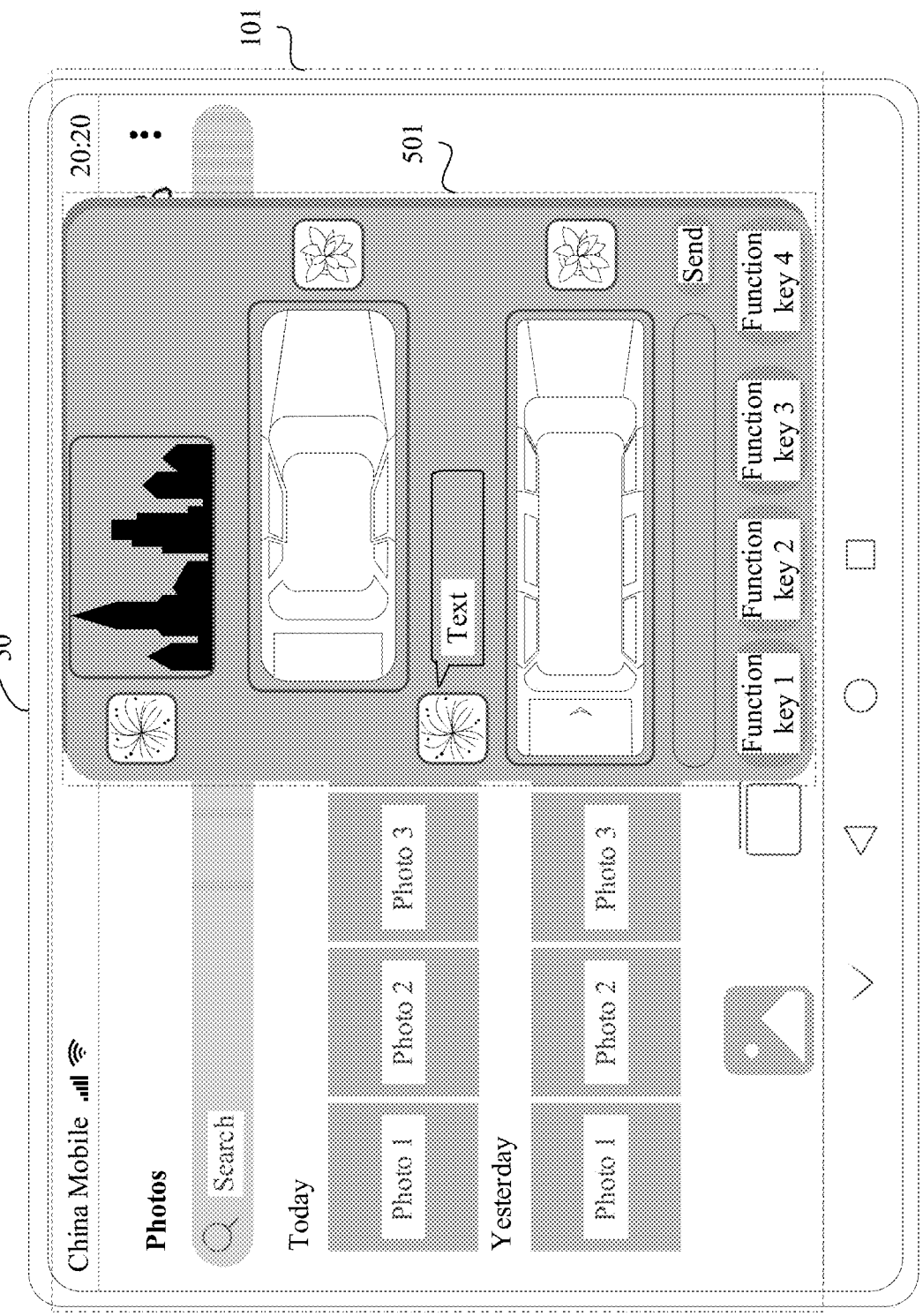

In some other embodiments, when the touch operation is a tap operation, if the aspect ratio value of the screen of the electronic device is within the second value range, the electronic device displays the application interface of the application B in the application interface of the application A in the floating window manner. As shown in FIG. 6C, the application interface 101 of the application A remains displayed on the current screen, and the electronic device 100 does not divide the display area of the current screen, but displays the application interface of the application B by using a floating window 501, that is, the application interface of the application B is displayed in the application interface 101 of the application A in a floating state. In some embodiments, a display area of the floating window 501 may be a preset fixed location, for example, a left half screen area determined based on screen coordinates corresponding to the touch operation, or may be a movable area block. The user may change a display location of the application interface of the application B on the screen by dragging the floating window 501.

As shown in FIG. 6A and FIG. 6B, in some specific embodiments, for example, when the foldable display of the electronic device 100 having a large screen or a square screen is in an unfolded state, if the electronic device 100 detects a touch operation performed by the user on the floating notification 102, to facilitate a one-hand operation of the user and improve user operation efficiency, the electronic device 100 may obtain screen coordinates corresponding to the touch operation, and determine, based on the obtained screen coordinates, a screen area for displaying the application interface of the application B. For example, the electronic device 100 determines, by determining whether the obtained screen coordinates are within a screen coordinate range of the first screen area 401 (or a left half screen 401) of the current screen or within a screen coordinate range of the second screen area 402 (or a right half screen 402) of the current screen, the screen area for displaying the application interface of the application B. For example, if the obtained screen coordinates are within the screen coordinate range of the first screen area 401 (or the left half screen 401) of the current screen, the electronic device 100 displays the application interface of the application B in the first screen area 401 (or the left half screen 401), and displays the application interface 101 of the application A in the second screen area 402 (or the right half screen 402). If the obtained screen coordinates are within the screen coordinate range of the second screen area 402 of the current screen, the electronic device 100 displays the application interface of the application B in the second screen area 402 (or the right half screen 402), and displays the application interface 101 of the application A in the first screen area 401 (or the left half screen 401).

In this embodiment of this disclosure, the screen areas for displaying the application interface of the application A and the application interface of the application B are determined based on the screen coordinates corresponding to the touch operation, so that the user can simultaneously view a currently running application and an application that receives new information, and the displayed application interfaces conform to an operation habit of people, which improves user experience.

In this embodiment of this disclosure, the user may drag the floating notification 102 through a drag operation. The electronic device 100 obtains a final location of the drag operation, that is, screen coordinates of a last location at which the drag operation ends, and determines, based on the screen coordinates of the final location of the drag operation, the screen area for displaying the application interface of the application B.

In some embodiments, when the touch operation is a drag operation, if the aspect ratio value of the screen of the electronic device 100 is within a first value range, the electronic device 100 displays the application interface of the application A and the application interface of the application B in a vertical split-screen manner.

In some specific embodiments, when the aspect ratio value of the screen of the electronic device 100 is within the first value range, that is, when the aspect ratio value of the screen of the electronic device 100 is close to 2, if the electronic device 100 detects a drag operation performed by the user on the floating notification 102, the electronic device 100 divides a display area of the electronic device into two screen areas: an upper half screen and a lower half screen, and determines whether screen coordinates of a final location of the drag operation are within a screen coordinate range of the upper half screen or a screen coordinate range of the lower half screen. If the screen coordinates of the final location of the drag operation are within the screen coordinate range of the upper half screen, the electronic device 100 displays the application interface of the application B on the upper half screen, and displays the application interface of the application A on the lower half screen. If the screen coordinates of the final location of the drag operation are within the screen coordinate range of the lower half screen, the electronic device 100 displays the application interface of the application B on the lower half screen, and displays the application interface of the application A on the upper half screen.

Figure 7A:
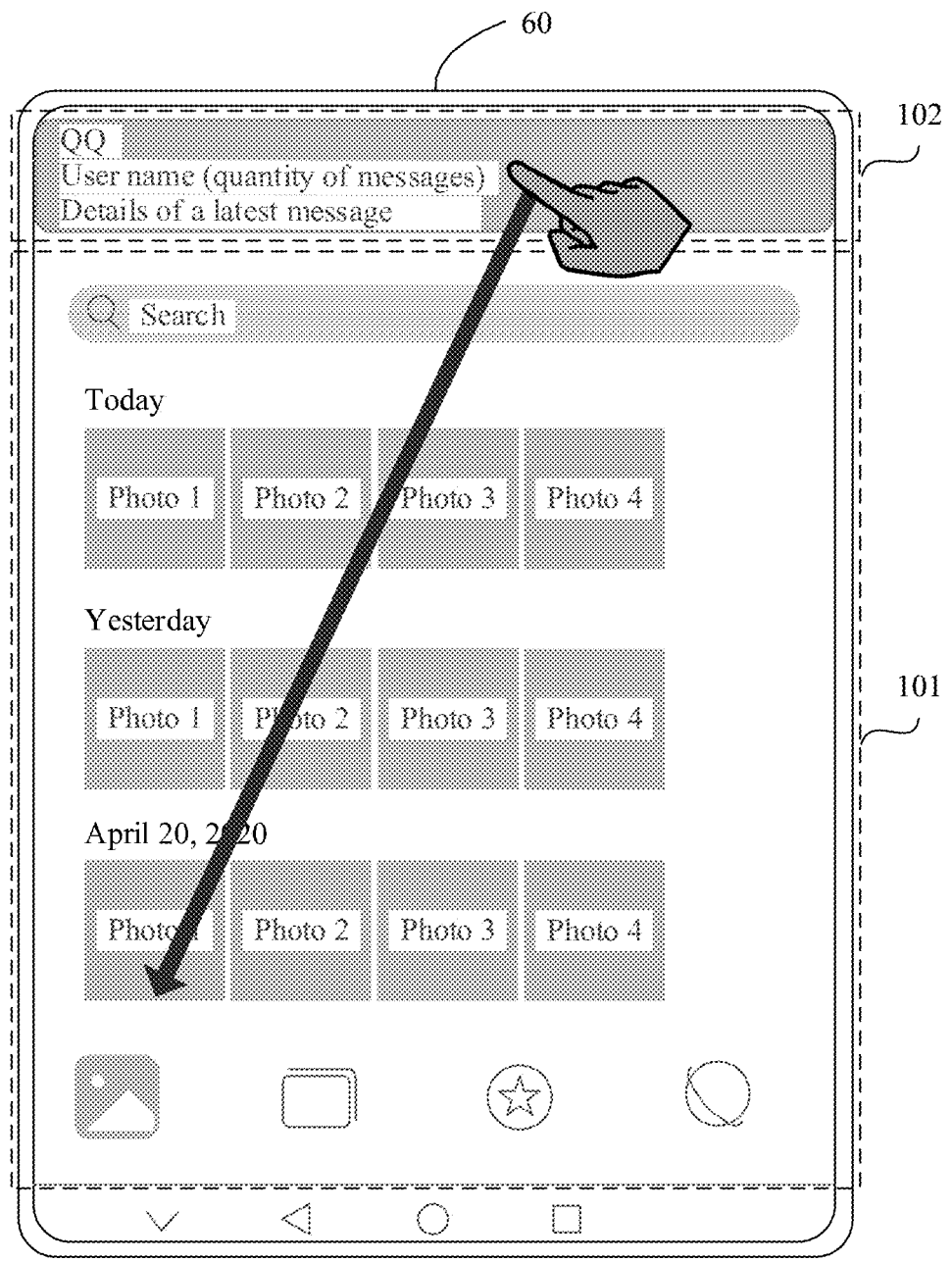
FIG. 7A to FIG. 7D are a schematic diagram of another application interface according to an embodiment of this disclosure.
Figure 7B:
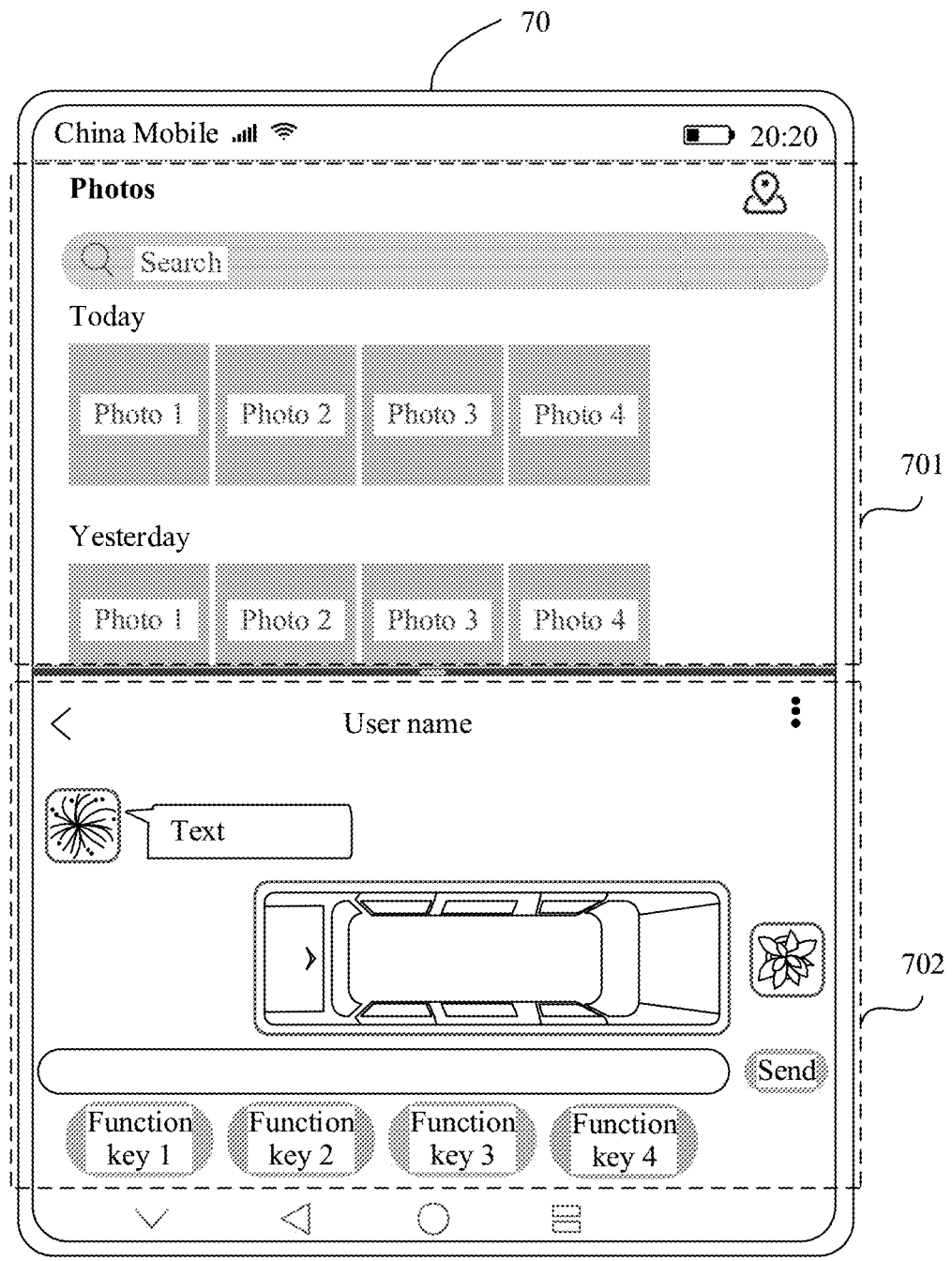

As shown in FIG. 7A, the user drags the floating notification on the current screen to a location P and releases a finger, and the electronic device 100 learns that the aspect ratio value of the screen of the electronic device is within the first value range. In this case, the electronic device 100 divides the display area of the electronic device into two screen areas: an upper half screen 701 and a lower half screen 702, and determines that screen coordinates of the location P are within a screen coordinate range of the lower half screen 702. As shown in FIG. 7B, the electronic device 100 displays the application interface of the application B on the lower half screen 702, and displays the application interface of the application A on the upper half screen 701. Similarly, when the coordinates of the location P are within a screen coordinate range of the upper half screen 701, the electronic device 100 displays the application interface of the application B on the upper half screen 701, and displays the application interface of the application A on the lower half screen 702.

In some other embodiments, when the touch operation is a drag operation, if the aspect ratio value of the screen of the electronic device is within a first value range, the electronic device displays the application interface of the application B in an upper half screen area or a lower half screen area of the electronic device in the application interface of the application A in the floating window manner.

In some specific embodiments, when the aspect ratio value of the screen of the electronic device 100 is within the first value range, that is, when the aspect ratio value of the screen of the electronic device 100 is close to 2, if the electronic device 100 detects a drag operation performed by the user on the floating notification 102, the electronic device 100 determines, based on screen coordinates of a final location of the drag operation, a display area for displaying the application interface of the application B by using a floating window. For example, if the screen coordinates of the final location of the drag operation are within a screen coordinate range of the upper half screen area, the electronic device 100 displays the application interface of the application B in the upper half screen area by using the floating window. If the screen coordinates of the final location of the drag operation are within a screen coordinate range of the lower half screen area, the electronic device 100 displays the application interface of the application B in the lower half screen area by using the floating window. If the screen coordinates of the final location of the drag operation are on a center line of the screen area, the electronic device 100 displays the application interface of the application B by using a floating window in a preset screen area range whose midpoint is the center line.

Figure 7C:
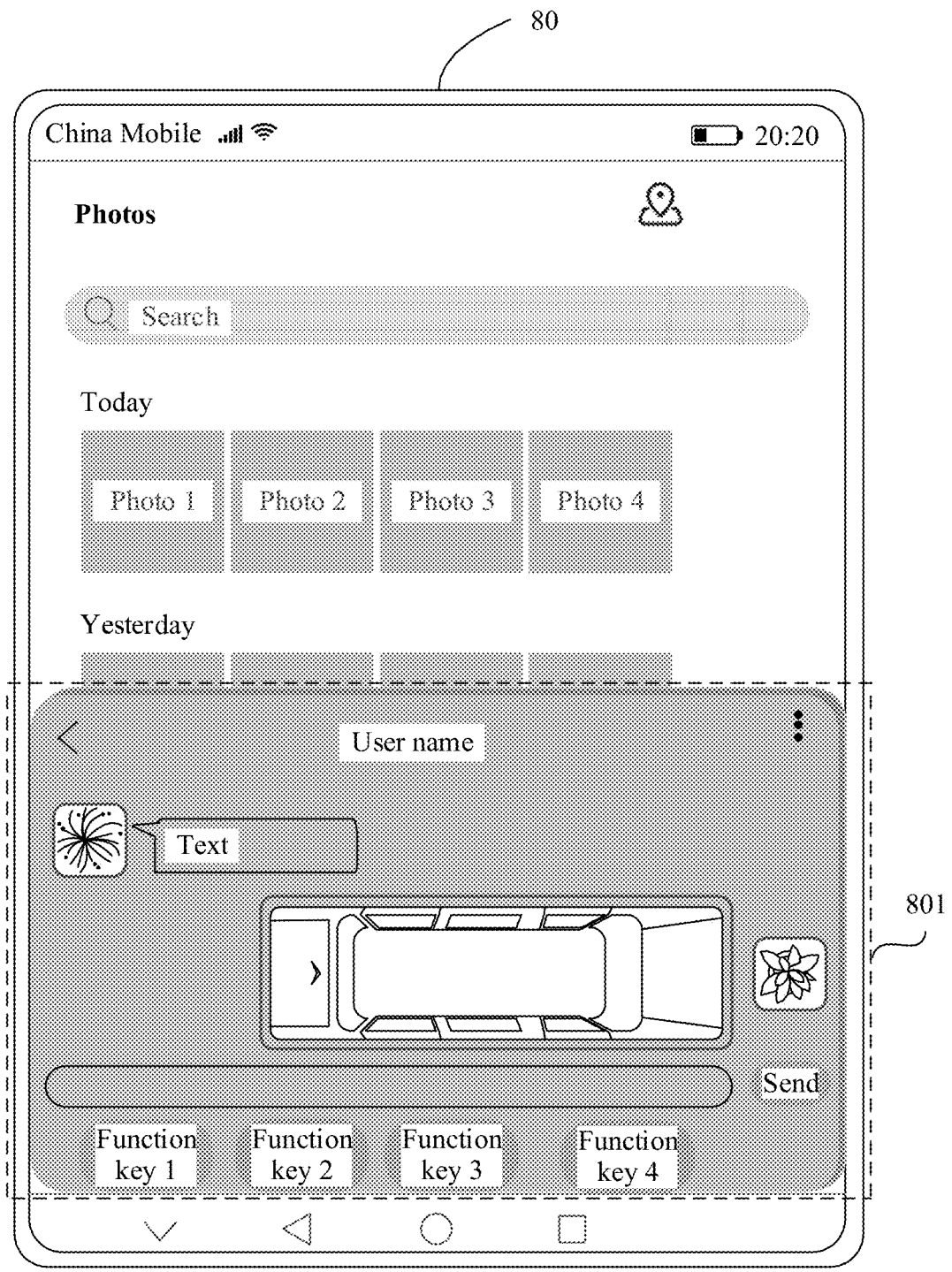
Figure 7D:
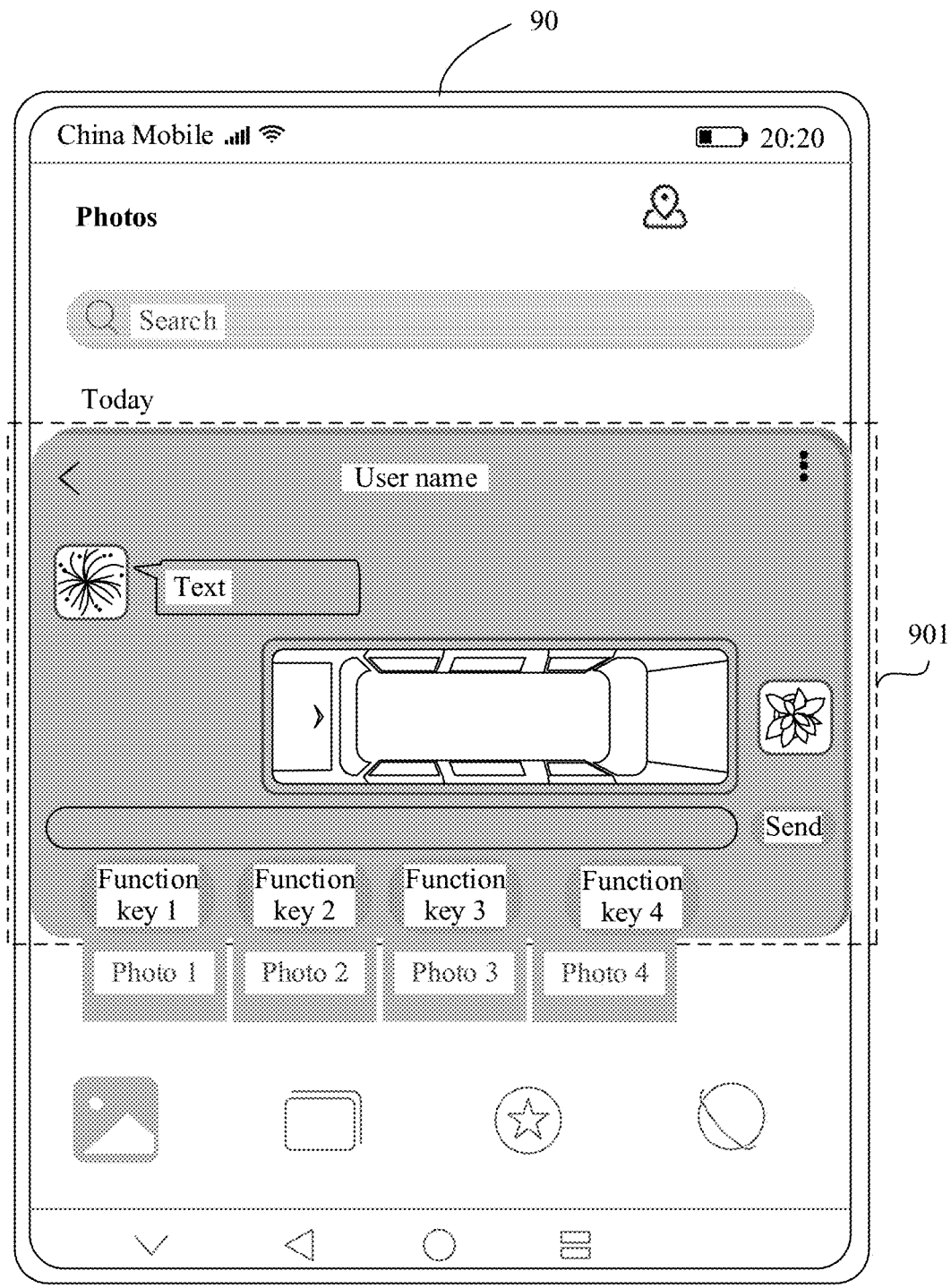

As shown in FIG. 7A, the user drags the floating notification on the current screen to the location P and releases the finger, and the electronic device 100 learns that the aspect ratio value of the screen of the electronic device is within the first value range, and determines that the screen coordinates of the location P are within the screen coordinate range of the lower half screen area. As shown in FIG. 7C, the electronic device 100 displays the application interface of the application B by using a floating window 801 in the screen coordinate range of the lower half screen area. As shown in FIG. 7D, when determining that the screen coordinates of the location P are on the center line of the current screen, the electronic device 100 displays the application interface of the application B by using a floating window 901 in a preset screen area range whose midpoint is the center line.

In some other embodiments, when the touch operation is a drag operation, if the aspect ratio value of the screen of the electronic device is within a second value range, the electronic device 100 displays the application interface of the application A and the application interface of the application B in a horizontal split-screen manner.

In some specific embodiments, when the aspect ratio value of the screen of the electronic device 100 is within the second value range, that is, when the aspect ratio value of the screen of the electronic device 100 is close to 1, if the electronic device 100 detects a drag operation performed by the user on the floating notification 102, the electronic device 100 divides a display area of the electronic device into two screen areas: a left half screen and a right half screen, and determines whether screen coordinates of a final location of the drag operation are within a screen coordinate range of the left half screen or a screen coordinate range of the right half screen. If the screen coordinates of the final location of the drag operation are within the screen coordinate range of the left half screen, the electronic device 100 displays the application interface of the application B on the left half screen, and displays the application interface of the application A on the right half screen. If the screen coordinates of the final location of the drag operation are within the screen coordinate range of the right half screen, the electronic device 100 displays the application interface of the application B on the right half screen, and displays the application interface of the application A on the left half screen.

In some other embodiments, when the touch operation is a drag operation, if the aspect ratio value of the screen of the electronic device is within a second value range, the electronic device displays the application interface of the application B in a left half screen area or a right half screen area of the electronic device in the application interface of the application A in the floating window manner.

In some specific embodiments, when the aspect ratio value of the screen of the electronic device 100 is within the second value range, that is, when the aspect ratio value of the screen of the electronic device 100 is close to 1, if the electronic device 100 detects a drag operation performed by the user on the floating notification 102, the electronic device 100 determines, based on screen coordinates of a final location of the drag operation, a display area for displaying the application interface of the application B by using the floating window. For example, if the screen coordinates of the final location of the drag operation are within a screen coordinate range of the left half screen area, the electronic device 100 displays the application interface of the application B in the left half screen area by using the floating window. If the screen coordinates of the final location of the drag operation are within a screen coordinate range of the right half screen area, the electronic device 100 displays the application interface of the application B in the right half screen area by using the floating window. If the screen coordinates of the final location of the drag operation are on a center line of the screen area, the electronic device 100 displays the application interface of the application B by using a floating window in a preset screen area range whose midpoint is the center line.

In some other specific embodiments, the electronic device displays the application interface of the application B by using a floating window in a preset screen area range whose midpoint is the final location of the drag operation.

Figure 8A:
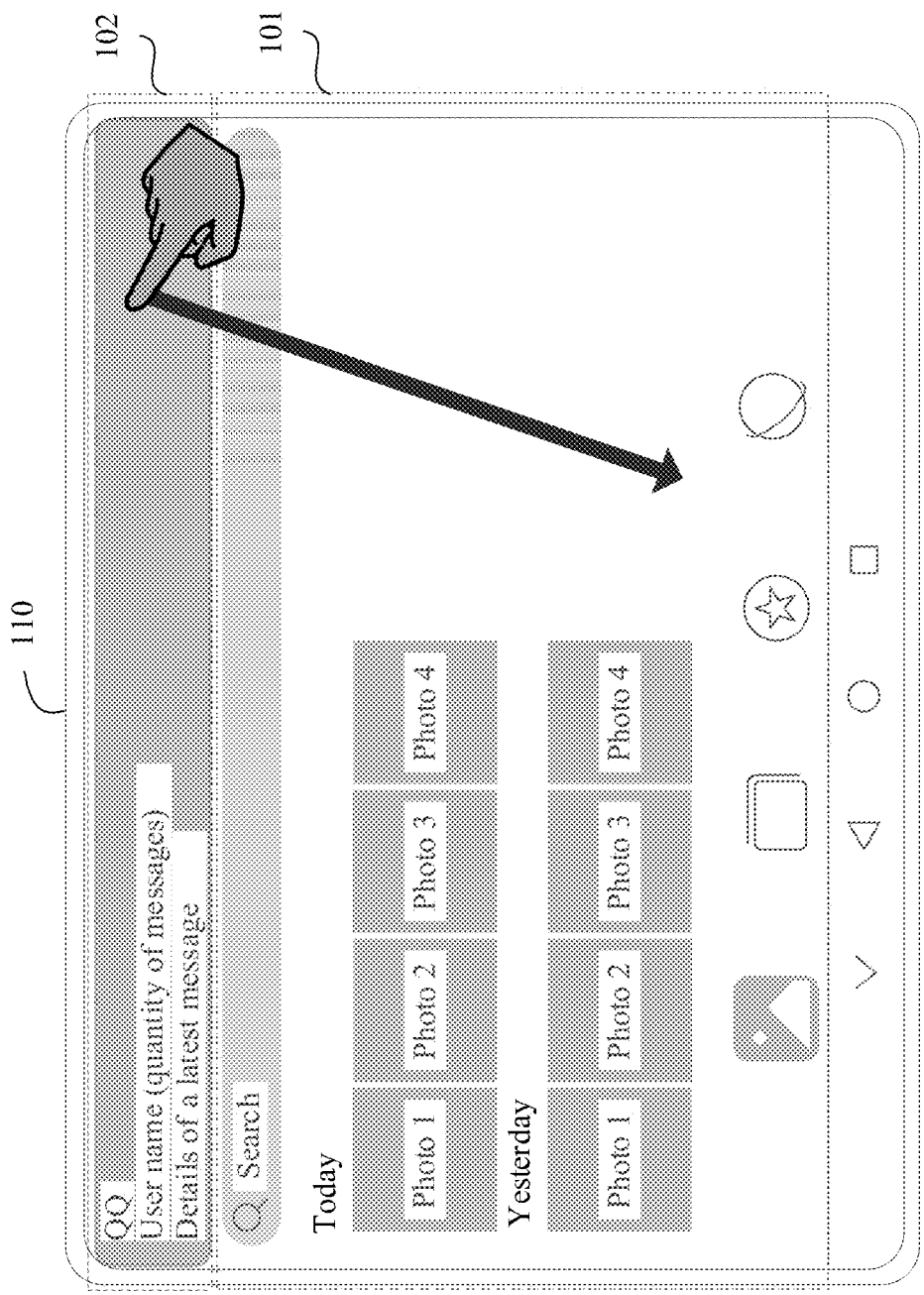
FIG. 8A, FIG. 8B, and FIG. 8C are a schematic diagram of another application interface according to an embodiment of this disclosure.
Figure 8B:
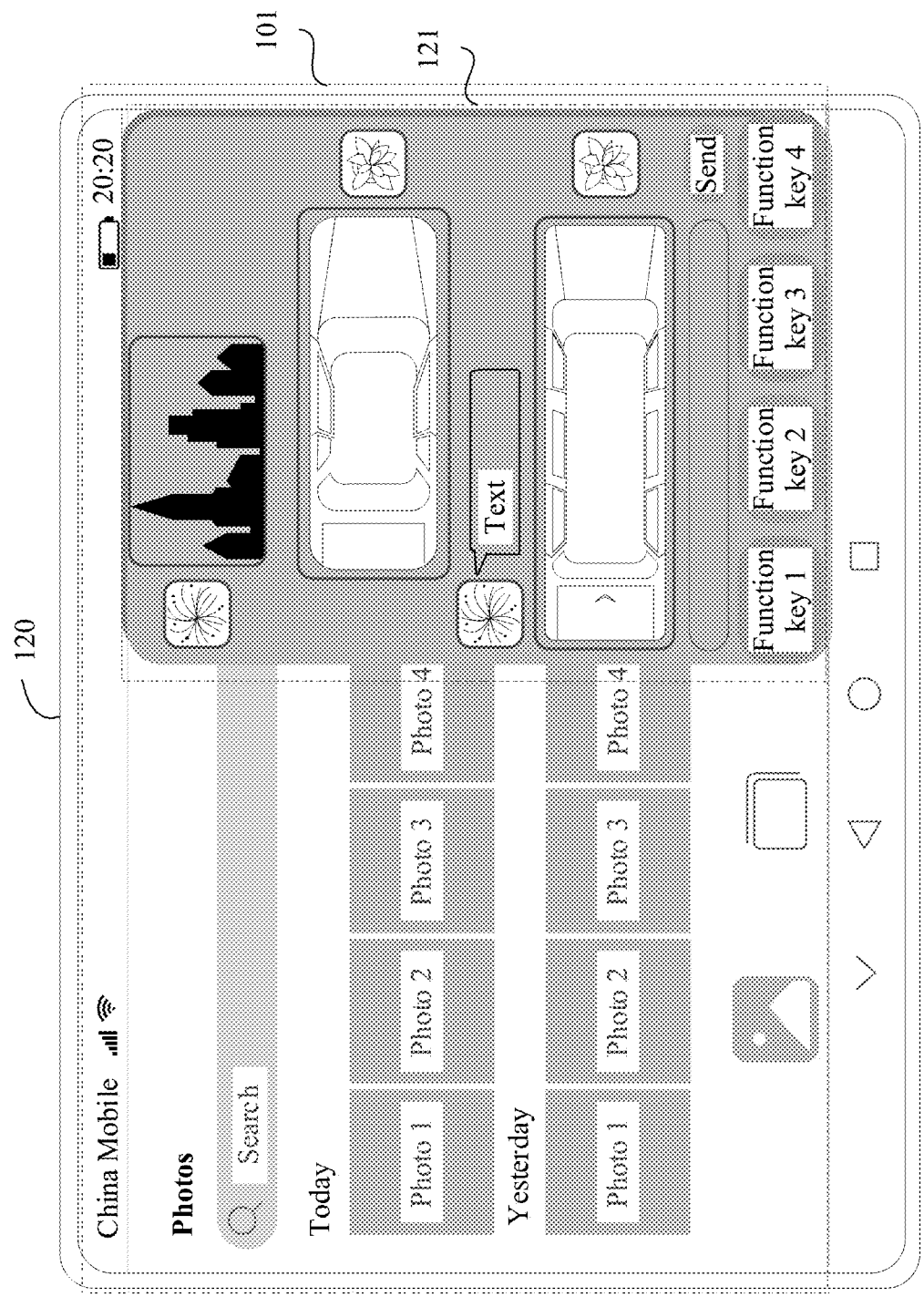
Figure 8C:
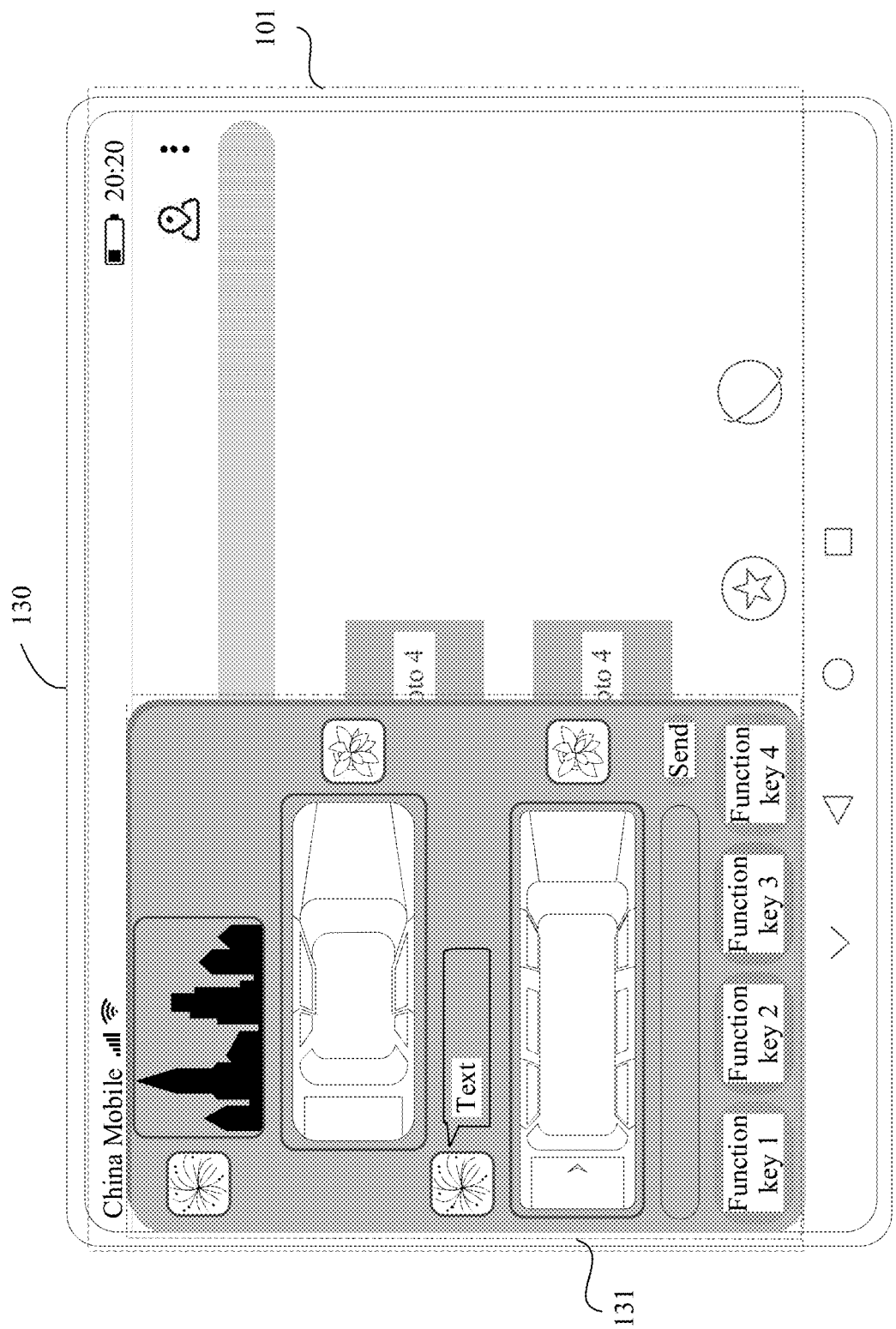

As shown in FIG. 8A, the user drags the floating notification 102 on the current screen to a location Q and releases a finger, and the electronic device 100 learns that the aspect ratio value of the screen of the electronic device is within the first value range, and determines that screen coordinates of the location Q are within the screen coordinate range of the right half screen area. As shown in FIG. 8B, the electronic device 100 displays the application interface of the application B by using a floating window 121 in the screen coordinate range of the right screen area. As shown in FIG. 8C, when determining that the screen coordinates of the location Q are on the center line of the current screen in the screen area, the electronic device 100 displays the application interface of the application B by using a floating window 131 in a preset screen area range whose midpoint is the center line. As shown in FIG. 8B and FIG. 8C, the application interface 101 of the application A remains unchanged in an original screen area, and the application interface of the application B is displayed in the application interface 101 of the application A in a floating manner.

Figure 9:
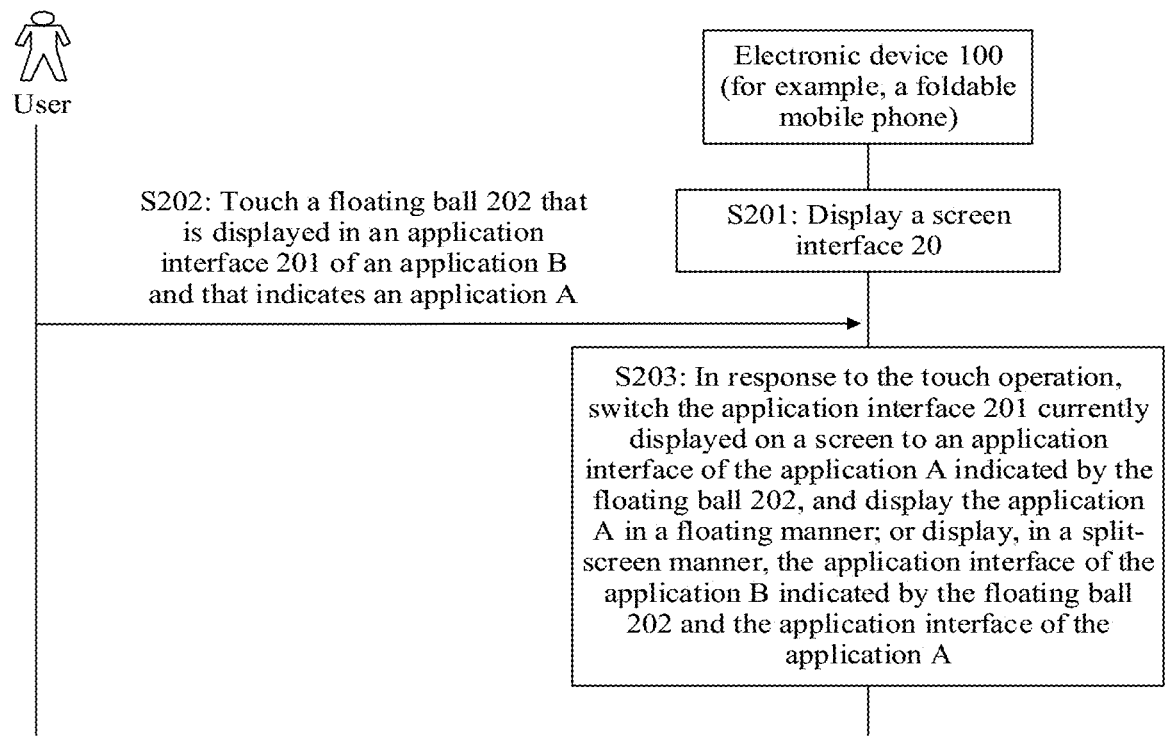
FIG. 9 is a schematic flowchart of another application interface interaction method according to an embodiment of this disclosure.

FIG. 9 is a schematic flowchart of another application interface interaction method according to an embodiment of this disclosure. As shown in FIG. 9, the method includes steps S201 to S203.

S201: An electronic device 100 displays a screen interface 20.

S202: The electronic device 100 detects a touch operation performed on a floating ball 202 that is displayed in an application interface 201 of an application B and that indicates an application A.

The touch operation may be a tap operation, or may be a press operation, or may be a touch and hold operation. This is not limited herein.

S203: In response to the touch operation, the electronic device 100 switches the application interface 201 currently displayed on a screen to an application interface of the application A indicated by the floating ball 202, and displays the application A in a floating manner, or the electronic device 100 displays, in a split-screen manner, the application interface of the application B indicated by the floating ball 202 and the application interface of the application A.

Figure 10B:
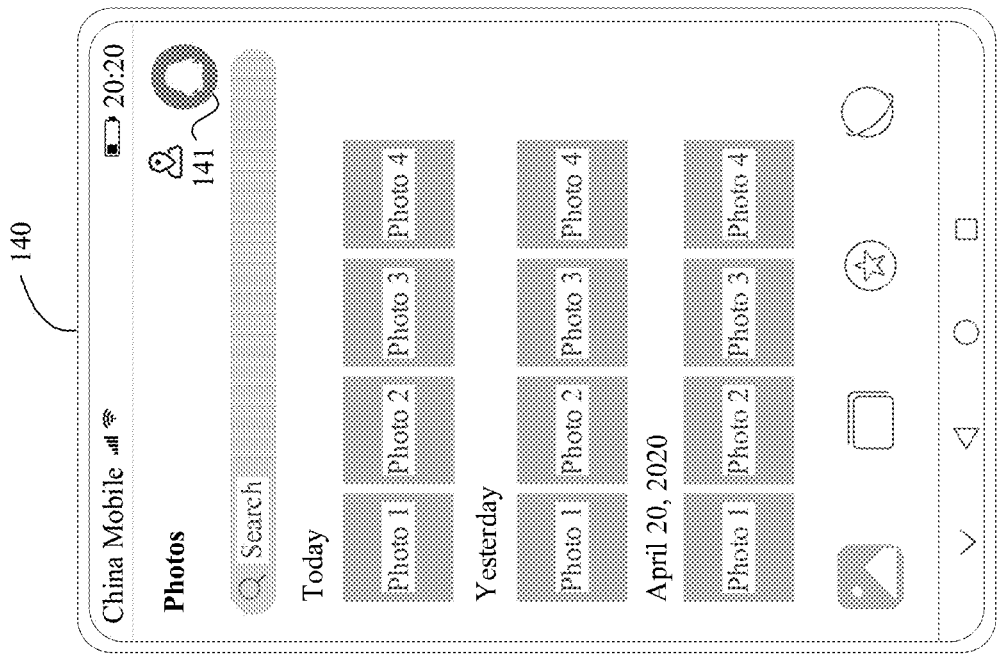
FIG. 10A and FIG. 10B are schematic diagram of an application interface according to an embodiment of this disclosure.
Figure 10A:
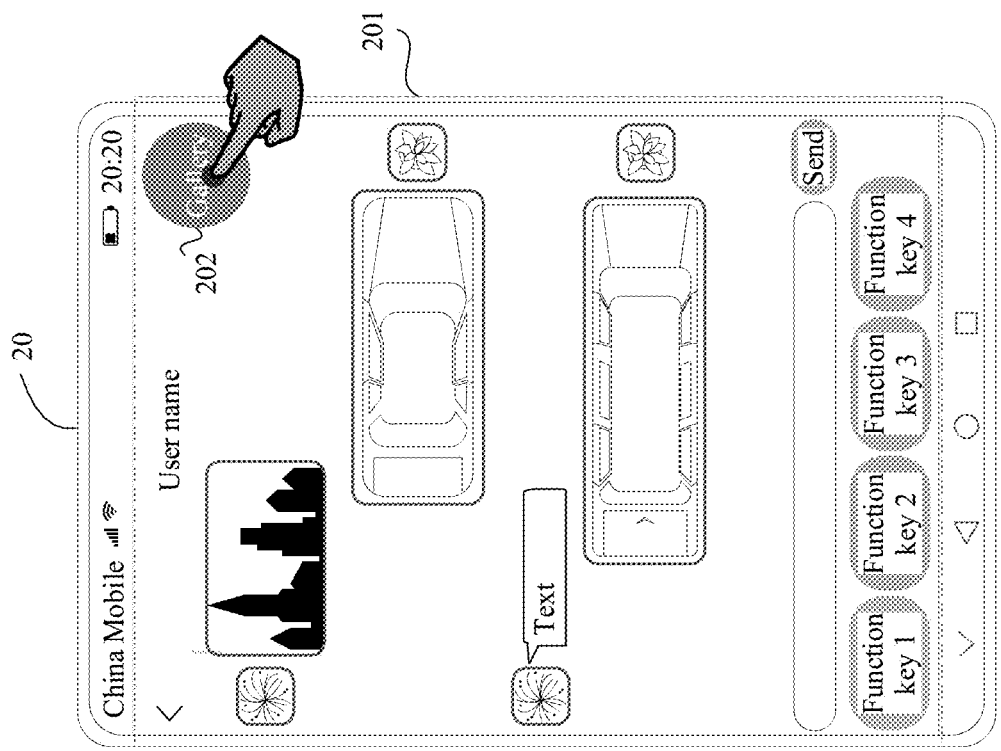

As shown in FIG. 10A, a user taps, presses, or touches and holds the floating ball 202 displayed in the application interface 201 of the application B. After the electronic device 100 detects the tap operation, the press operation, or the touch and hold operation on the floating ball 202, as shown in FIG. 10B, the electronic device 100 switches the application interface 201 of the application B currently displayed on a screen to the application interface 101 of the application A, and indicates the application B by using a floating ball 141, so that the user can quickly switch to the application interface 201 of the application B by tapping, pressing, or touching and holding the floating ball 141.

In this embodiment of this disclosure, tapping, pressing, or touching and holding a floating point or a floating ball displayed in a current interface to trigger the electronic device 100 to display an application interface of an application indicated by the floating point or the floating ball reduces time for a user to return to the application interface of the application indicated by the floating point or the floating ball (the application indicated by the floating point or the floating ball is an application before a currently running application), and improves user operation efficiency. In addition, the application displayed by using the floating point or the floating ball does not block a currently displayed application interface, to facilitate viewing by the user.

Figure 11:
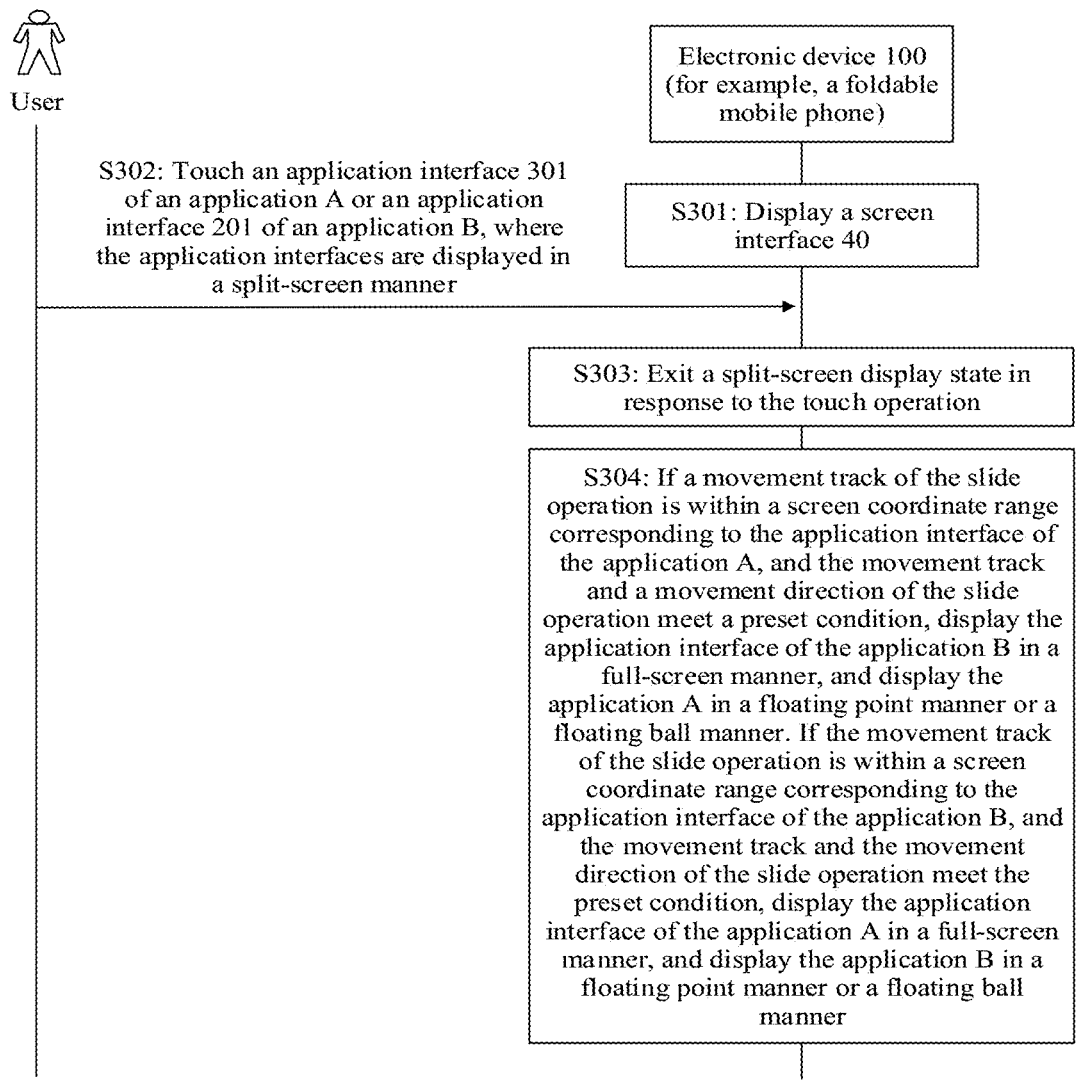
FIG. 11 is a schematic flowchart of another application interface interaction method according to an embodiment of this disclosure.

FIG. 11 is a schematic flowchart of another application interface interaction method according to an embodiment of this disclosure. As shown in FIG. 11, the method includes steps S301 to S304.

S301: An electronic device 100 displays a screen interface 40.

Figure 12A:
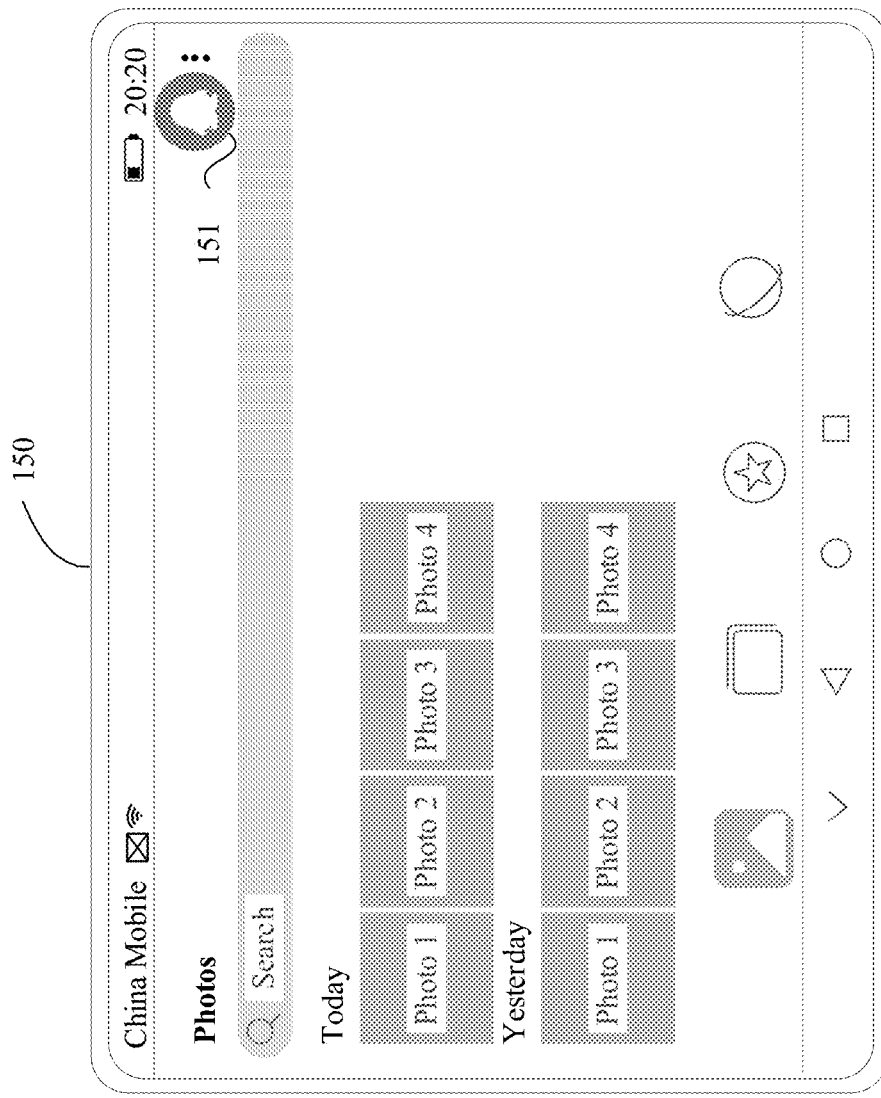
FIG. 12A, FIG. 12B, and FIG. 12C are a schematic diagram of an application interface according to an embodiment of this disclosure.

As shown in FIG. 12A, in the screen interface 40 displayed by the electronic device 100, an application interface 101 of an application A and an application interface 201 of an application B are displayed in a split-screen manner.

S302: The electronic device 100 detects a slide operation on the application interface 101 of the application A or the application interface 201 of the application B.

S303: The electronic device 100 exists a split-screen display state in response to the slide operation.

S304: If a movement track of the slide operation is within a screen coordinate range corresponding to the application interface of the application A, and the movement track and a movement direction of the slide operation meet a preset condition, the electronic device 100 displays the application interface of the application B in a full-screen manner, and displays the application A in a floating point manner or a floating ball manner. If the movement track of the slide operation is within a screen coordinate range corresponding to the application interface of the application B, and the movement track and the movement direction of the slide operation meet the preset condition, the electronic device 100 displays the application interface of the application A in a full-screen manner, and displays the application B in a floating point manner or a floating ball manner.

Figure 12B:
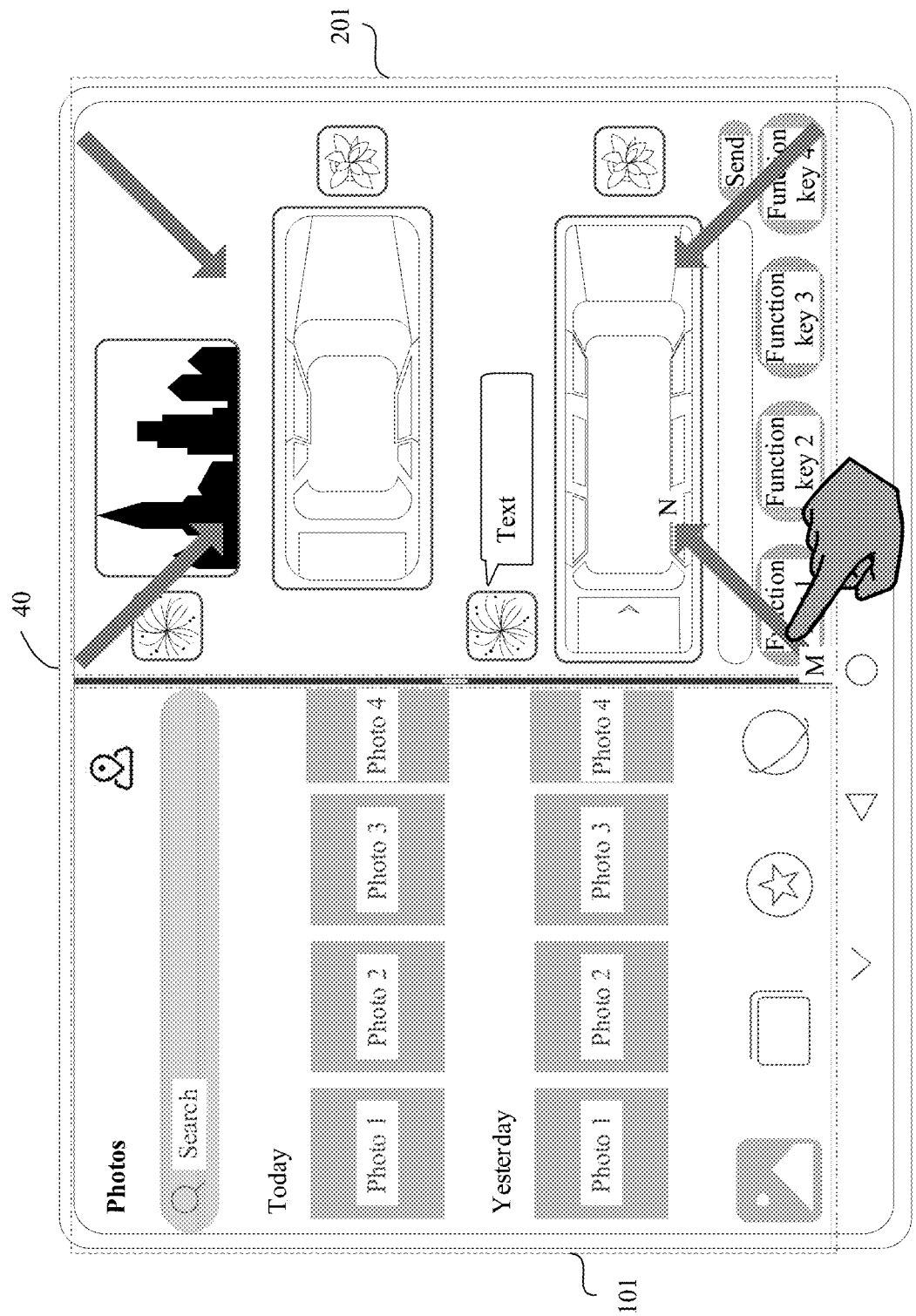

As shown in FIG. 12A, when a finger of a user moves, on a screen of the electronic device 100, from a location M in a range of upper left, lower left, upper right, and lower right corners of the application interface of the application B in a diagonal direction to a location N in the application interface of the application A, as shown in FIG. 12B, in response to the slide operation, the electronic device 100 exits a split-screen display state, displays the application interface of the application B on the current screen, and displays the application A by using a floating point or a floating ball 151.

The preset condition is that a start point of the movement track of the slide operation is a preset location in the application interface, for example, any location in a range of upper left, lower left, upper right, and lower right corners of the application interface, and the movement direction is a preset direction, for example, a diagonal direction, to distinguish from an operation of sliding the screen by the user to display different display content. In this embodiment of this disclosure, based on a touch operation that meets the preset condition, an application may be switched from a split-screen display manner to a floating point manner or a floating ball manner, so that the user can conveniently view an application interface of the other application in a full-screen manner, to improve user experience.

Figure 12C:
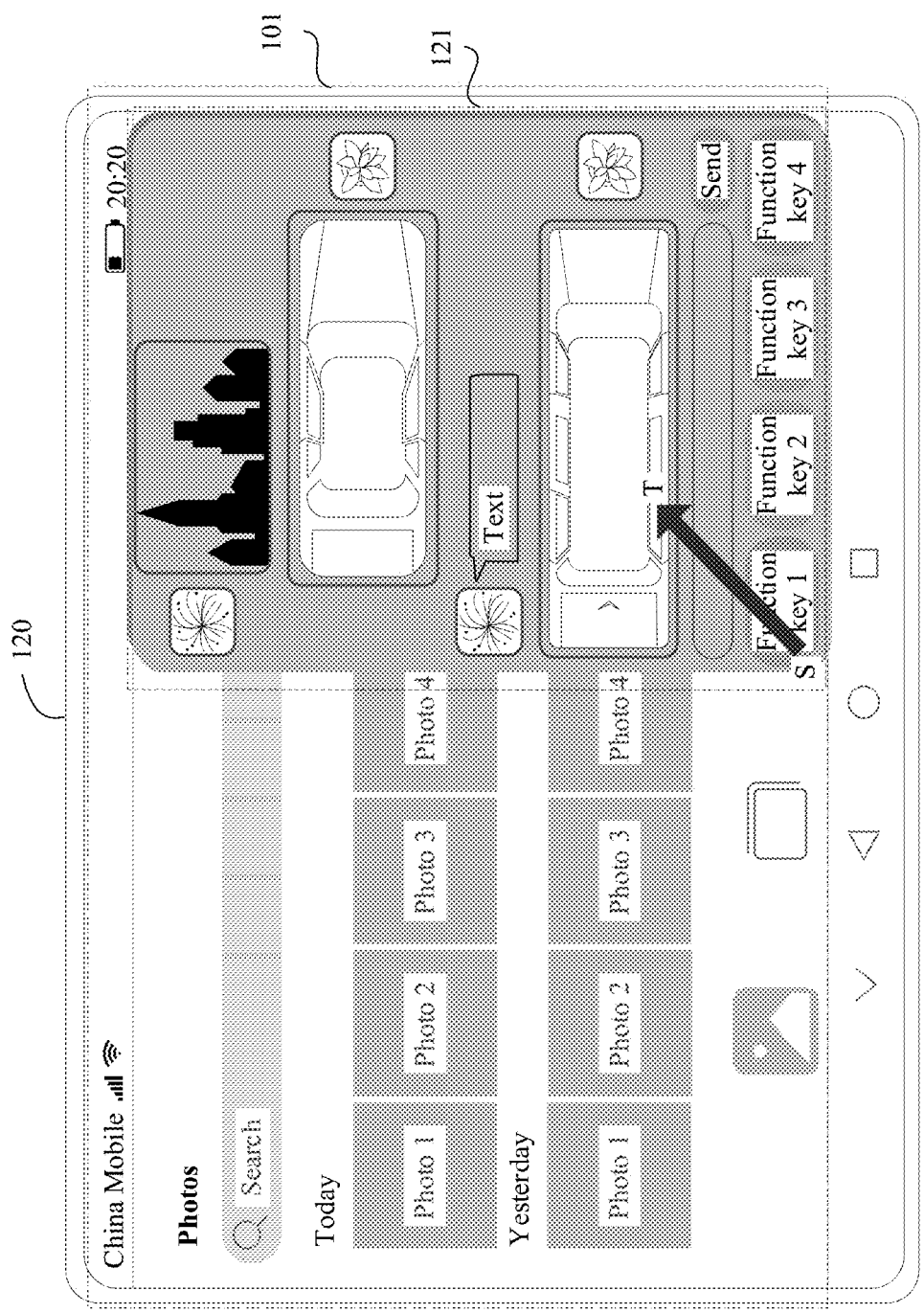

As shown in FIG. 12C, when the user slides from a corner location S in a diagonal direction to a location T in the application interface of the application B displayed in a floating window manner, the electronic device 100 detects a slide operation on the floating window 121. As shown in FIG. 12B, in response to the slide operation, the electronic device 100 hides the floating window 121, and displays, by using a floating point or a floating ball, the application B indicated by the floating window 121.

In some embodiments, when the electronic device runs the application A, the application B receives information and displays a floating notification in the application interface of the application A. However, the user may view details of the floating notification after a period of time. If the user does not perform any processing on the floating notification 102, the floating notification 102 exits or is hidden after preset duration elapses. If the user wants to enter the application B to which the floating notification 102 belongs, the user needs to enter a task interface or a search interface to find the application B, and therefore experience is very poor. To resolve this problem, an embodiment of this disclosure provides another application interface interaction method. When a touch operation performed by a user on the floating notification 102 is detected, the application B to which the floating notification 102 belongs is displayed in a floating point manner or a floating ball manner, so that when the user wants to view the application B to which the floating notification 102 belongs, the user may quickly enter the application interface of the application B by using a floating point or a floating ball that indicates the application B. This improves user experience.

Figure 13:
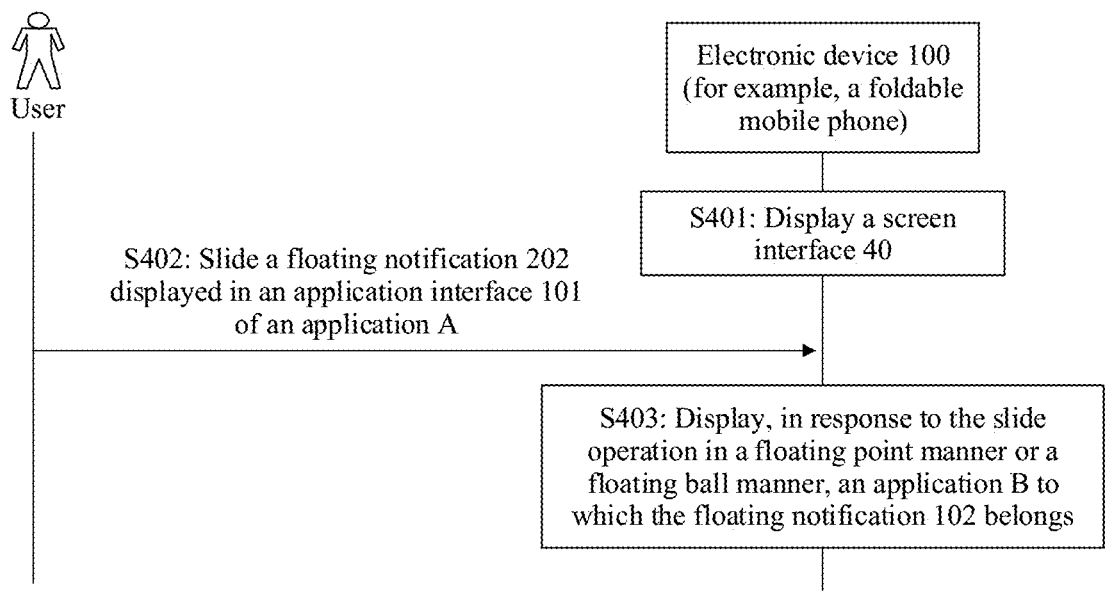
FIG. 13 is a schematic flowchart of another application interface interaction method according to an embodiment of this disclosure.

FIG. 13 is a schematic flowchart of another application interface interaction method according to an embodiment of this disclosure. As shown in FIG. 13, the method includes steps S401 to S403.

S401: An electronic device 100 displays a screen interface 10.

S402: The electronic device detects a slide operation on a floating notification 102 displayed in an application interface 101 of an application A.

S403: The electronic device 100 displays, in response to the slide operation in a floating point manner or a floating ball manner, an application B to which the floating notification 102 belongs.

The slide operation is sliding leftward or rightward in a horizontal direction.

In this embodiment of this disclosure, the slide operation is performed on the floating notification 102, so that the application to which the floating notification 102 belongs can be displayed in a floating point manner or a floating ball manner. In this way, when a user subsequently wants to view an application interface of the application to which the floating notification 102 belongs, the user may quickly enter, by touching a floating point or a floating ball that indicates the application to which the floating notification 102 belongs, the application interface of the application to which the floating notification 102 belongs, to improve display efficiency of application interfaces, and reduce a quantity of user operations.

In some other embodiments, when the electronic device 100 detects a touch operation, for example, a tap operation, a press operation, or a touch and hold operation, performed by the user on the floating notification 102 displayed in the application interface 101 of the application A, in response to the touch operation, a size of a screen of an electronic device 100 having no foldable display is not considered, that is, regardless of whether the electronic device 100 is in a landscape display state or a portrait display state, the electronic device 100 displays, in a full-screen manner, the application interface of the application B to which the floating notification 102 belongs, and displays the application A in a floating ball manner or a floating point manner. In this way, the user can quickly browse the application interface of the application to which the floating notification 102 belongs, and can quickly switch to the application interface of the application A by using a floating point or a floating ball that indicates the application A. In addition, blocking of the application interface of the currently displayed application by the other application is reduced, and user experience is improved.

An embodiment of this disclosure further provides a computer-readable storage medium. The computer-readable storage medium stores instructions. When the instructions are run on a computer or a processor, the computer or the processor is enabled to perform one or more steps in any one of the foregoing methods.

An embodiment of this disclosure further provides a computer program product including instructions. When the computer program product runs on a computer or a processor, the computer or the processor is enabled to perform one or more steps in any one of the foregoing methods.

All or some of the foregoing embodiments may be implemented by using software, hardware, firmware, or any combination thereof. When software is used to implement embodiments, all or some embodiments may be implemented in a form of a computer program product. The computer program product includes one or more computer instructions. When the computer program instructions are loaded and executed on the computer, the procedures or functions according to embodiments of this disclosure are all or partially generated. The computer may be a general-purpose computer, a dedicated computer, a computer network, or another programmable apparatus. The computer instruction may be stored in a computer-readable storage medium, or may be transmitted by using the computer-readable storage medium. The computer instructions may be transmitted from a website, computer, server, or data center to another web site, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

A person of ordinary skill in the art may understand that all or some of the processes of the methods in embodiments may be implemented by a computer program instructing related hardware. The program may be stored in a computer-readable storage medium. When the program runs, the processes of the methods in embodiments are performed. The foregoing storage medium includes any medium that can store program code, such as a read-only memory (ROM), a RAM, a magnetic disk, or an optical disc.

The foregoing descriptions are merely specific implementations of embodiments of this disclosure, but are not intended to limit the protection scope of embodiments of this disclosure. Any variation or replacement within the technical scope disclosed in embodiments of this disclosure shall fall within the protection scope of embodiments of this disclosure. Therefore, the protection scope of embodiments of this disclosure shall be subject to the protection scope of the claims.

What is claimed is:

1. An application interface interaction method implemented by an electronic device having a foldable display screen, wherein the application interface interaction method comprises:
   running a first application on the electronic device in full screen;
   displaying, on a first application interface of a first application, a floating notification indicating information received by the electronic device for a second application while running the first application;
   detecting, on the floating notification, a first touch operation;
   obtaining, in response to the first touch operation, an aspect ratio of a screen of the electronic device;
   performing, in response to the first touch operation, and based on the aspect ratio, when the electronic device is in an unfolded state, either:
      displaying, a second application interface of the second application in a floating window manner on the first application interface; or
      displaying the first application interface and the second application interface in a split-screen manner, and selecting according to the aspect ratio whether to display the second application interface on the split-screen; and
   further in response to the first touch operation, performing, when the electronic device is in a folded state, either:
      switching the first application interface to the second application interface; or
      displaying, in full screen, the second application interface and displaying the first application in a floating point manner or a floating ball manner.

2. The application interface interaction method of claim 1, wherein the first touch operation is a click operation, and wherein the application interface interaction method further comprises further displaying, in response to the click operation in a target screen area of the foldable display screen of the electronic device, the second application interface on the first application interface in the target screen area in the floating window manner.

3. The application interface interaction method of claim 1, wherein the first touch operation is a drag operation, wherein an end location of the drag operation is in a target screen area of the foldable display screen of the electronic device, and wherein the application interface interaction method further comprises:
further displaying, in response to the dragging operation, the first application interface and the second application interface in the split-screen manner, wherein the second application interface is located in the target screen area; or
further displaying, in response to the dragging operation, the second application interface on the first application interface in the floating window manner, wherein the second application interface is located in the target screen area.

4. The application interface interaction method of claim 1, wherein the second application interface is displayed in the floating window manner, and wherein the application interface interaction method further comprises:
detecting a second touch operation on the second application interface; and
in response to the second touch operation:
hiding a floating window; and
displaying the second application in the floating point manner or the floating ball manner.

5. The application interface interaction method of claim 1, wherein after displaying the first application interface and the second application interface in the split-screen manner, the application interface interaction method further comprises:
detecting, when the electronic device is in a split-screen display state, a second touch operation on the first application interface or the second application interface; and
exiting, in response to the second touch operation, the split-screen display state.

6. The application interface interaction method of claim 5, wherein the second touch operation is a sliding operation, and wherein the application interface interaction method further comprises:
when the sliding operation is in a first screen coordinate range corresponding to the first application interface and a first movement track of the sliding operation is sliding from a first corner area of the first screen coordinate range to a center area:
displaying the second application interface in a full screen; and
displaying the first application in the floating point manner or the floating ball manner; and
when the sliding operation is in a second screen coordinate range corresponding to the second application interface and a second movement track of the sliding operation is sliding from a second corner area of the second screen coordinate range to the center area:
displaying the first application interface in the full screen; and
displaying the second application in the floating point manner or the floating ball manner.

7. The application interface interaction method of claim 1, wherein after displaying the first application in the floating point manner or the floating ball manner, the application interface interaction method further comprises:
detecting a third touch operation performed on a floating point or a floating ball; and
in response to the third touch operation, either:
displaying the first application interface in a full screen and displaying the second application in the floating point manner or the floating ball manner; or
displaying the first application and the second application in the split-screen manner.

8. The application interface interaction method of claim 1, wherein the split-screen manner comprises a left-right screen splitting manner or a top-down screen splitting manner.

9. The application interface interaction method of claim 1, wherein displaying the second application in the floating window manner includes displaying the second application at a predetermined location on a screen using a virtual key in a preset shape, wherein displaying the first application in the floating point manner or the floating ball manner includes displaying the second application at a predetermined location on a screen using a virtual key in a preset shape, and wherein the application interface interaction method further comprises:
further displaying the second application interface on a current screen and displaying the first application in the floating point manner or the floating ball manner;
further displaying the second application interface in the first application interface in the floating window manner; or
further displaying the first application interface and the second application interface in the split-screen manner.

10. The application interface interaction method of claim 1, wherein the first touch operation is a drag operation, wherein the split-screen manner is a vertical split-screen manner, and wherein performing displaying the first application interface and the second application interface in the split-screen manner comprises:
dividing a display area of the electronic device into two screen areas comprising an upper half screen and a lower half screen; and
selecting according to the aspect ratio whether to display the second application interface on the upper half screen and the first application interface on the lower half screen or to display the second application interface on the lower half screen and the first application interface on the upper half screen.

11. An electronic device comprising:
a foldable display screen; and
a processor coupled to the foldable display screen and configured to:
run a first application on the electronic device in full screen;
display, on a first application interface of a first application, a floating notification indicating information received by the electronic device for a second application while running the first application;
detect, on the floating notification, a first touch operation;
obtaining, in response to the first touch operation, an aspect ratio of a screen of the electronic device;
perform, in response to the first touch operation and based on the aspect ratio, when the foldable display screen is in an unfolded state, either:
displaying a second application interface of the second application in a floating window manner on the first application interface; or displaying the first application interface and the second application interface in a split-screen manner, and selecting according to the aspect ratio whether to display the second application interface on the split-screen; and further perform, in response to the first touch operation and based on the aspect ratio, when the foldable display screen is in a folded state, either:
- switching the first application interface to the second application interface; or
- displaying, in full screen, the second application interface and display the first application in a floating point manner or a floating ball manner.

12. The electronic device of claim 11, wherein the foldable display screen comprises a target screen area, wherein the first touch operation is a click operation, and wherein the process r is further configured to further display, in response to the click operation in the target screen area, the second application interface on the first application interface in the target screen area in the floating window manner.

13. The electronic device of claim 11, wherein the foldable display screen comprises a target screen area, wherein the first touch operation is a drag operation, wherein an end location of the drag operation is in the target screen area, and wherein the processor is further configured to:
- further display, in response to the dragging operation, the first application interface and the second application interface in the split-screen manner, wherein the second application interface is located in the target screen area; or
- further display, in response to the dragging operation, the second application interface on the first application interface in the floating window manner, wherein the second application interface is located in the target screen area.

14. The electronic device of claim 11, wherein the second application interface is displayed in the floating window manner, and wherein the processor is further configured to:
- detect a second touch operation on the second application interface; and
- in response to the second touch operation:
  - hide a floating window; and
  - display the second application in the floating point manner or the floating ball manner.

15. The electronic device of claim 11, wherein after displaying the first application interface and the second application interface in the split-screen manner, the processor is further configured to:
- detect, when the electronic device is in a split-screen display state, a second touch operation on the first application interface or the second application interface; and
- exit, in response to the second touch operation, the split-screen display state.

16. The electronic device of claim 15, wherein the second touch operation is a sliding operation, and wherein the processor is further configured to:
- when the sliding operation is in a first screen coordinate range corresponding to the first application interface and a first movement track of the sliding operation is sliding from a first corner area of the first screen coordinate range to a center area:
  - display the second application interface in a full screen; and
  - display the first application in the floating point manner or the floating ball manner; and
- when the sliding operation is in a second screen coordinate range corresponding to the second application interface and a second movement track of the sliding operation is sliding from a second corner area of the second screen coordinate range to the center area:
  - display the first application interface in the full screen; and
  - display the second application in the floating point manner or the floating ball manner.

17. The electronic device of claim 11, wherein after displaying the first application in the floating point manner or the floating ball manner, the processor is further configured to:
- detect a third touch operation performed on a floating point or a floating ball; and
- in response to the third touch operation, either:
  - display the first application interface in a full screen and displaying the second application in the floating point manner or the floating ball manner; or
  - display the first application and the second application in the split-screen manner.

18. The electronic device of claim 11, wherein the split-screen manner comprises a left-right screen splitting manner or a top-down screen splitting manner.

19. The electronic device of claim 11, wherein displaying the second application in the floating window manner includes displaying the second application at a predetermined location on a screen using a virtual key in a preset shape, wherein displaying the first application in the floating point manner or the floating ball manner includes displaying the second application at a predetermined location on a screen using a virtual key in a preset shape, and wherein the first application interface is configured to:
- further display the second application interface on a current screen and displaying the first application in the floating point manner or the floating ball manner;
- further display the second application interface in the first application interface in the floating window manner; or
- further display the first application interface and the second application interface in the split-screen manner.

20. The electronic device of claim 11, wherein the first touch operation is a drag operation, wherein the split-screen manner is a vertical split-screen manner, and wherein performing displaying the first application interface and the second application interface in the split-screen manner comprises:
- dividing a display area of the electronic device into two screen areas comprising an upper half screen and a lower half screen; and
- selecting according to the aspect ratio whether to display the second application interface on the upper half screen and the first application interface on the lower half screen or to display the second application interface on the lower half screen and the first application interface on the upper half screen.

* * * * *

UNITED STATES PATENT AND TRADEMARK OFFICE
CERTIFICATE OF CORRECTION

PATENT NO. : 12,254,174 B2
APPLICATION NO. : 17/970731
DATED : March 18, 2025
INVENTOR(S) : Jie Xu Page 1 of 1

It is certified that error appears in the above-identified patent and that said Letters Patent is hereby corrected as shown below:

In the Claims

Claim 12, Column 35, Line 17: "process r is further" should read "process is further"

Signed and Sealed this
Sixth Day of May, 2025

Coke Morgan Stewart
*Acting Director of the United States Patent and Trademark Office*